US012374792B2

(12) United States Patent
Zhang et al.

(10) Patent No.: US 12,374,792 B2
(45) Date of Patent: Jul. 29, 2025

(54) METHOD FOR CONTROLLING ANTENNA POLARIZATION DIRECTION AND ANTENNA SYSTEM

(71) Applicant: Huawei Technologies Co., Ltd., Shenzhen (CN)

(72) Inventors: Ming Zhang, Hangzhou (CN); Bin Wang, Hangzhou (CN); Xueliang Shi, Hangzhou (CN); Yunfei Qiao, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 301 days.

(21) Appl. No.: 18/178,623

(22) Filed: Mar. 6, 2023

(65) Prior Publication Data

US 2023/0208029 A1 Jun. 29, 2023

Related U.S. Application Data

(63) Continuation of application No. PCT/CN2021/112913, filed on Aug. 17, 2021.

(30) Foreign Application Priority Data

Sep. 7, 2020 (CN) ......................... 202010929217.6

(51) Int. Cl.
*H01Q 3/36* (2006.01)
*H01Q 3/24* (2006.01)

(52) U.S. Cl.
CPC ................. *H01Q 3/36* (2013.01); *H01Q 3/24* (2013.01)

(58) Field of Classification Search
CPC .................................. H01Q 3/36; H01Q 3/24
USPC .......................................................... 342/372
See application file for complete search history.

(56) References Cited

U.S. PATENT DOCUMENTS

2010/0241423 A1 9/2010 Jackson et al.
2013/0290003 A1 10/2013 Choo
2013/0321206 A1* 12/2013 Chang ...................... H01Q 3/34 342/372

FOREIGN PATENT DOCUMENTS

CN 101620854 A 1/2010
CN 108061975 A * 5/2018 ........... G02B 27/283

* cited by examiner

*Primary Examiner* — Harry K Liu
(74) *Attorney, Agent, or Firm* — Slater Matsil, LLP

(57) ABSTRACT

Embodiments of this application relate to a method for controlling an antenna polarization direction and an antenna system. A first feed array and a second feed array whose polarization directions are orthogonal are disposed in the antenna system. A polarization direction of a beam of a third planar array may be adjusted by adjusting parameters such as beam widths/a beam width of the first feed array and/or the second feed array, phase centers/a phase center of the first feed array and/or the second feed array, and a phase difference between the first feed array and the second feed array.

20 Claims, 16 Drawing Sheets

METHOD FOR CONTROLLING ANTENNA POLARIZATION DIRECTION AND ANTENNA SYSTEM

CROSS-REFERENCE TO RELATED APPLICATIONS

This application is a continuation of International Application No. PCT/CN2021/112913, filed on Aug. 17, 2021 which claims priority to Chinese Patent Application No. 202010929217.6, filed on Sep. 7, 2020. The disclosures of the aforementioned applications are hereby incorporated by reference in their entireties.

TECHNICAL FIELD

This application relates to the field of communication technologies, and in particular, to a method for controlling antenna polarization direction and an antenna system.

BACKGROUND

Circularly polarized antennas are generally used on a spacecraft moving at a high speed, so that the spacecraft can receive signals in any state. On a flight device, circularly polarized antennas can reduce signal leakage and attenuation, and can also eliminate polarization distortion caused by Faraday rotation in the ionosphere. In mobile communication, a polarization diversity manner is used to reduce multipath fading. However, in a ground communication system, a linear polarization manner is usually used. For example, a base station uses +/−45° linearly polarized antennas.

With the development of space-ground integrated communication, a single terminal has a requirement for communication with a space-borne device, a ground base station, and the like. Therefore, a function of supporting arbitrary polarization by an antenna of the single terminal becomes an urgent requirement.

SUMMARY

This application provides a method for controlling an antenna polarization direction and an antenna system, to implement a function of supporting arbitrary polarization by an antenna of a single terminal.

According to a first aspect, an antenna system is provided, including at least one processor, a first feed array, a second feed array, and a third planar array, where a polarization direction of the first feed array is orthogonal to a polarization direction of the second feed array, and the third planar array is configured to reflect or transmit beams from the first feed array and the second feed array; the at least one processor may be configured to: control a phase center of the beam of the first feed array to be at a first position and a beam width to be a first width, control a phase center of the beam of the second feed array to be at a second position and a beam width to be a second width, and control a phase difference between the beam of the first feed array and the beam of the second feed array to be a first phase difference. In this case, the third planar array is configured to reflect or transmit the beam of the first feed array and the beam of the second feed array to form a beam in a first polarization direction. The at least one processor may be further configured to: adjust one or more of the phase centers/center of the beams/beam of the first feed array and/or the second feed array, the beam widths/width of the beams/beam of the first feed array and/or the second feed array, or the phase difference between the beam of the first feed array and the beam of the second feed array. In this case, a beam in a second polarization direction may be formed after the third planar array reflects or transmits an adjusted beam of the first feed array and an adjusted beam of the second feed array. The first polarization direction is different from the second polarization direction.

According to the antenna system provided in this embodiment of this application, a polarization direction of a beam of the third planar array may be adjusted by adjusting a beam width, a phase center, a phase difference, or the like of a dual-feed array (that is, the first feed array and the second feed array), to transmit a beam in any polarization direction. Therefore, arbitrary polarization switching can be truly supported. Compared with a conventional technology, there is no need to mechanically rotate a feed or reconfigure polarization of a reflection array unit, and implementation is simple and costs are low, and it is more convenient for actual use.

In a possible implementation, the dual-feed array may be a dual-linearly polarized feed array. For example, the polarization direction of the first feed array is a horizontal polarization direction, and the polarization direction of the second feed array is a vertical polarization direction. Alternatively, the dual-feed array may be a dual-circularly polarized feed array. For example, the polarization direction of the first feed array is a left-hand circular polarization direction, and the polarization direction of the second feed array is a right-hand circular polarization direction.

It should be understood that the foregoing two implementations are merely examples rather than limitations, and a possibility of another implementation is not excluded during actual application.

In a possible implementation, the first polarization direction is any one of linear polarization, circular polarization, or elliptical polarization, and the second polarization direction is any one of linear polarization, circular polarization, or elliptical polarization.

It should be understood that polarization types of the first polarization direction and the second polarization direction may be the same or may be different. This is not limited in this application. For example, if the first polarization direction is linear polarization, and the second polarization direction is circular polarization or elliptical polarization, polarization types of the first polarization direction and the second polarization direction are the same. Alternatively, for example, if the first polarization direction is horizontal polarization, and the second polarization direction is vertical polarization, polarization types of the first polarization direction and the second polarization direction are different.

In a possible implementation, when adjusting the phase centers/center of the beams/beam of the first feed array and/or the second feed array, the at least one processor may specifically use beam sweeping for implementation. For example, the first feed array is controlled to perform beam sweeping, so that the phase center of the beam of the first feed array is deflected; and/or the second feed array is controlled to perform beam sweeping, so that the phase center of the beam of the second feed array is deflected.

The beam sweeping may be implemented in an electrical control manner.

In this way, the phase center of the dual-feed array may be controlled to be deflected in the electrical control manner, to control a gain of a beam of the dual-feed array, and obtain an amplitude value required for arbitrary polarization, so that the antenna system supports any polarization direction.

In a possible implementation, when adjusting the beam widths/width of the beams/beam of the first feed array and/or the second feed array, the at least one processor may specifically enable or disable an array unit for implementation. For example, the first feed array is controlled to disable or enable at least one unit; and/or the second feed array is controlled to disable or enable at least one unit. A larger quantity of units that are turned on by the first feed array and/or the second feed array indicates a narrower beam, and on the contrary, a larger quantity of units that are turned off by the first feed array and/or the second feed array indicates a wider beam.

The array unit may be turned on or turned off in the electrical control manner.

In this way, the beam width of the dual-feed array may be controlled to be changed in the electrical control manner, to control a gain of a beam of the dual-feed array, and obtain an amplitude value required for arbitrary polarization, so that the antenna system supports any polarization direction.

In a possible implementation, a phase-adjustable component is disposed in a first direction of each unit of the third planar array. When adjusting the phase difference between the beam of the first feed array and the beam of the second feed array, the at least one processor may specifically adjust an electrical parameter (such as a current, a voltage, or a capacitor) of the phase-adjustable component of each unit, and the electrical parameter is used to control a shape and/or a size (such as an electrical length) of the unit of the third planar array.

When the electrical parameter changes, the shape and/or the size of the array unit changes. However, after beams are emitted by array units of different shapes and/or sizes, phases change to different degrees. Therefore, adjusting the electrical parameter of the phase-adjustable component can implement compensation for phases/a phase of the first feed array and/or the second feed array, to adjust the phase difference between the first feed array and the second feed array, and further implement arbitrary elliptical polarization.

In a possible implementation, the at least one processor may be further configured to: before adjusting one or more of the phase centers/center of the beams/beam of the first feed array and/or the second feed array, the beam widths/width of the beams/beam of the first feed array and/or the second feed array, or the phase difference between the beam of the first feed array and the beam of the second feed array, detect an amplitude and a phase of the beam of the first feed array and an amplitude and a phase of the beam of the second feed array, and determine adjustment coefficients/an adjustment coefficient of the phase centers/center of the beams/beam of the first feed array and/or the second feed array, or determine adjustment coefficients/an adjustment coefficient of the beam widths/width of the beams/beam of the first feed array and/or the second feed array, or determine an adjustment coefficient of the phase difference between the beam of the first feed array and the beam of the second feed array.

In this way, when adjusting parameters such as the phase center, the beam width, and the phase difference, the processor may perform precise adjustment and control based on a corresponding adjustment coefficient.

According to a second aspect, an embodiment of this application provides an antenna system, including at least one processor, a first feed array, a second feed array, and a third planar array, where a polarization direction of the first feed array is orthogonal to a polarization direction of the second feed array, and the third planar array is configured to reflect or transmit beams from the first feed array and the second feed array. The at least one processor may be configured to: when the third planar array receives a beam in a first polarization direction, control a phase center of the beam of the first feed array to be at a first position and a beam width to be a first width, control a phase center of the beam of the second feed array to be at a second position and a beam width to be a second width, and control a phase difference between the beam of the first feed array and the beam of the second feed array to be a first phase difference. In this case, after the third planar array reflects or transmits the beam in the first polarization direction, a first beam and a second beam may be formed, and are respectively received by the first feed array and the second feed array. The at least one processor may be further configured to: when the third planar array receives a beam in a second polarization direction, adjust one or more of the phase centers/center of the beams/beam of the first feed array and/or the second feed array, the beam widths/width of the beams/beam of the first feed array and/or the second feed array, or the phase difference between the beam of the first feed array and the beam of the second feed array. In this case, after the third planar array reflects or transmits the beam in the second polarization direction, a third beam and a fourth beam may be formed, and are respectively received by the first feed array and the second feed array. The first polarization direction is different from the second polarization direction.

According to the antenna system provided in this embodiment of this application, a polarization direction of a beam of the third planar array may be adjusted by adjusting a beam width, a phase center, a phase difference, or the like of a dual-feed array (that is, the first feed array and the second feed array), to receive a beam in any polarization direction. Compared with a conventional technology, there is no need to mechanically rotate a feed or reconfigure polarization of a reflection array unit, and implementation is simple and costs are low, and it is more convenient for actual use.

In a possible implementation, the dual-feed array may be a dual-linearly polarized feed array. For example, the polarization direction of the first feed array is a horizontal polarization direction, and the polarization direction of the second feed array is a vertical polarization direction. Alternatively, the dual-feed array may be a dual-circularly polarized feed array. For example, the polarization direction of the first feed array is a left-hand circular polarization direction, and the polarization direction of the second feed array is a right-hand circular polarization direction.

It should be understood that the foregoing two implementations are merely examples rather than limitations, and a possibility of another implementation is not excluded during actual application.

In a possible implementation, the first polarization direction is any one of linear polarization, circular polarization, or elliptical polarization, and the second polarization direction is any one of linear polarization, circular polarization, or elliptical polarization.

It should be understood that polarization types of the first polarization direction and the second polarization direction may be the same or may be different. This is not limited in this application. For example, if the first polarization direction is linear polarization, and the second polarization direction is circular polarization or elliptical polarization, polarization types of the first polarization direction and the second polarization direction are the same. Alternatively, for example, if the first polarization direction is horizontal polarization, and the second polarization direction is vertical polarization, polarization types of the first polarization direction and the second polarization direction are different.

In a possible implementation, when adjusting the phase centers/center of the beams/beam of the first feed array and/or the second feed array, the at least one processor may specifically use beam sweeping for implementation. For example, the first feed array is controlled to perform beam sweeping, so that the phase center of the beam of the first feed array is deflected; and/or the second feed array is controlled to perform beam sweeping, so that the phase center of the beam of the second feed array is deflected.

The beam sweeping may be implemented in an electrical control manner.

In this way, the phase center of the dual-feed array may be controlled to be deflected in the electrical control manner, to control a gain of a beam of the dual-feed array, and obtain an amplitude value required for arbitrary polarization, so that the antenna system supports any polarization direction.

In a possible implementation, when adjusting the beam widths/width of the beams/beam of the first feed array and/or the second feed array, the at least one processor may specifically enable or disable an array unit for implementation. For example, the first feed array is controlled to disable or enable at least one unit; and/or the second feed array is controlled to disable or enable at least one unit. A larger quantity of units that are turned on by the first feed array and/or the second feed array indicates a narrower beam, and on the contrary, a larger quantity of units that are turned off by the first feed array and/or the second feed array indicates a wider beam.

The array unit may be turned on or turned off in the electrical control manner.

In this way, the beam width of the dual-feed array may be controlled to be changed in the electrical control manner, to control a gain of a beam of the dual-feed array, and obtain an amplitude value required for arbitrary polarization, so that the antenna system supports any polarization direction.

In a possible implementation, a phase-adjustable component is disposed in a first direction of each unit of the third planar array. When adjusting the phase difference between the beam of the first feed array and the beam of the second feed array, the at least one processor may specifically adjust an electrical parameter (such as a current, a voltage, or a capacitor) of the phase-adjustable component of each unit, and the electrical parameter is used to control a shape and/or a size (such as an electrical length) of the unit of the third planar array.

When the electrical parameter changes, the shape and/or the size of the array unit changes. However, after beams are emitted by array units of different shapes and/or sizes, phases change to different degrees. Therefore, adjusting the electrical parameter of the phase-adjustable component can implement compensation for phases/a phase of the first feed array and/or the second feed array, to adjust the phase difference between the first feed array and the second feed array, and further implement arbitrary elliptical polarization.

In a possible implementation, the at least one processor may be further configured to: before adjusting one or more of the phase centers/center of the beams/beam of the first feed array and/or the second feed array, the beam widths/width of the beams/beam of the first feed array and/or the second feed array, or the phase difference between the beam of the first feed array and the beam of the second feed array, detect an amplitude and a phase of the beam of the first feed array and an amplitude and a phase of the beam of the second feed array, and determine adjustment coefficients/an adjustment coefficient of the phase centers/center of the beams/beam of the first feed array and/or the second feed array, or determine adjustment coefficients/an adjustment coefficient of the beam widths/width of the beams/beam of the first feed array and/or the second feed array, or determine an adjustment coefficient of the phase difference between the beam of the first feed array and the beam of the second feed array.

In this way, when adjusting parameters such as the phase center, the beam width, and the phase difference, the processor may perform precise adjustment and control based on a corresponding adjustment coefficient.

According to a third aspect, an embodiment of this application provides an antenna system, including at least one processor, a first feed array, a second feed array, and a third planar array, where a polarization direction of the first feed array is orthogonal to a polarization direction of the second feed array, and the third planar array is configured to reflect or transmit beams from the first feed array and the second feed array. The at least one processor may be configured to: control a phase center of the beam of the first feed array to be at a first position and a beam width to be a first width, control a phase center of the beam of the second feed array to be at a second position and a beam width to be a second width, and control a phase difference between the beam of the first feed array and the beam of the second feed array to be a first phase difference. In this case, after the third planar array reflects or transmits the beam of the first feed array and the beam of the second feed array, a beam in a first polarization direction is formed. The at least one processor may be further configured to: adjust one or more of the phase centers/center of the beams/beam of the first feed array and/or the second feed array, the beam widths/width of the beams/beam of the first feed array and/or the second feed array, or the phase difference between the beam of the first feed array and the beam of the second feed array. In this case, after the third planar array reflects or transmits an adjusted beam of the first feed array and an adjusted beam of the second feed array, a beam in a second polarization direction is formed. The at least one processor may be further configured to: when the third planar array receives the beam in the first polarization direction, control the phase center of the beam of the first feed array to be at the first position and the beam width to be the first width, control the phase center of the beam of the second feed array to be at the second position and the beam width to be the second width, and control the phase difference between the beam of the first feed array and the beam of the second feed array to be the first phase difference. In this case, after the third planar array reflects or transmits the beam in the first polarization direction, a first beam and a second beam are formed, and are respectively received by the first feed array and the second feed array. The at least one processor may be further configured to: when the third planar array receives the beam in the second polarization direction, adjust one or more of the phase centers/center of the beams/beam of the first feed array and/or the second feed array, the beam widths/width of the beams/beam of the first feed array and/or the second feed array, or the phase difference between the beam of the first feed array and the beam of the second feed array. In this case, after the third planar array reflects or transmits the beam in the second polarization direction, a third beam and a fourth beam are formed, and are respectively received by the first feed array and the second feed array.

According to the antenna system provided in this embodiment of this application, a polarization direction of a beam of the third planar array may be adjusted by adjusting a beam width, a phase center, a phase difference, or the like of a dual-feed array (that is, the first feed array and the second feed array), to send a beam in any polarization direction, and also receive a beam in any polarization direction. Compared with a conventional technology, there is no need to mechanically rotate a feed or reconfigure polarization of a reflection array unit, and implementation is simple and costs are low, and it is more convenient for actual use.

For a further specific implementation, refer to the possible implementations in the first aspect or the second aspect. Details are not described herein again.

According to a fourth aspect, an embodiment of this application provides a method for controlling an antenna polarization direction, applied to an antenna system, where the antenna system includes a first feed array, a second feed array, and a third planar array, a polarization direction of the first feed array is orthogonal to a polarization direction of the second feed array, and the third planar array is configured to reflect or transmit beams from the first feed array and the second feed array. The method includes: controlling a phase center of the beam of the first feed array to be at a first position and a beam width to be a first width, controlling a phase center of the beam of the second feed array to be at a second position and a beam width to be a second width, and controlling a phase difference between the beam of the first feed array and the beam of the second feed array to be a first phase difference, so that the beam of the first feed array and the beam of the second feed array form a beam in a first polarization direction after being reflected or transmitted by the third planar array; and adjusting one or more of the phase centers/center of the beams/beam of the first feed array and/or the second feed array, the beam widths/width of the beams/beam of the first feed array and/or the second feed array, or the phase difference between the beam of the first feed array and the beam of the second feed array, so that the beam of the first feed array and the beam of the second feed array form a beam in a second polarization direction after being reflected or transmitted by the third planar array, where the first polarization direction is different from the second polarization direction.

In a possible implementation, the polarization direction of the first feed array is a horizontal polarization direction, and the polarization direction of the second feed array is a vertical polarization direction; or the polarization direction of the first feed array is a left-hand circular polarization direction, and the polarization direction of the second feed array is a right-hand circular polarization direction.

In a possible implementation, the first polarization direction is any one of linear polarization, circular polarization, or elliptical polarization, and the second polarization direction is any one of linear polarization, circular polarization, or elliptical polarization.

In a possible implementation, the adjusting the phase centers/center of the beams/beam of the first feed array and/or the second feed array includes: controlling the first feed array to perform beam sweeping, so that the phase center of the beam of the first feed array is deflected; and/or controlling the second feed array to perform beam sweeping, so that the phase center of the beam of the second feed array is deflected.

In a possible implementation, the adjusting the beam widths/width of the beams/beam of the first feed array and/or the second feed array includes: controlling the first feed array to disable or enable at least one unit; and/or controlling the second feed array to disable or enable at least one unit.

In a possible implementation, a phase-adjustable component is disposed in a first direction of each unit of the third planar array; and the adjusting a phase difference between the beam of the first feed array and the beam of the second feed array includes: adjusting an electrical parameter of the phase-adjustable component of each unit, where the electrical parameter is used to control an electrical length of a unit of the third planar array.

In a possible implementation, before the adjusting one or more of the phase centers/center of the beams/beam of the first feed array and/or the second feed array, the beam widths/width of the beams/beam of the first feed array and/or the second feed array, or the phase difference between the beam of the first feed array and the beam of the second feed array, the method further includes: detecting an amplitude and a phase of the beam of the first feed array and an amplitude and a phase of the beam of the second feed array, and determining adjustment coefficients/an adjustment coefficient of the phase centers/center of the beams/beam of the first feed array and/or the second feed array, or determining adjustment coefficients/an adjustment coefficient of the beam widths/width of the beams/beam of the first feed array and/or the second feed array, or determining an adjustment coefficient of the phase difference between the beam of the first feed array and the beam of the second feed array.

According to a fifth aspect, an embodiment of this application provides a method for controlling an antenna polarization direction, applied to an antenna system, where the antenna system includes a first feed array, a second feed array, and a third planar array, a polarization direction of the first feed array is orthogonal to a polarization direction of the second feed array, and the third planar array is configured to reflect or transmit beams from the first feed array and the second feed array. The method includes: when the third planar array receives a beam in a first polarization direction, controlling a phase center of the beam of the first feed array to be at a first position and a beam width to be a first width, controlling a phase center of the beam of the second feed array to be at a second position and a beam width to be a second width, and controlling a phase difference between the beam of the first feed array and the beam of the second feed array to be a first phase difference, so that a first beam and a second beam that are formed after the third planar array reflects or transmits the beam in the first polarization direction can be respectively received by the first feed array and the second feed array; and when the third planar array receives a beam in a second polarization direction, adjusting one or more of the phase centers/center of the beams/beam of the first feed array and/or the second feed array, the beam widths/width of the beams/beam of the first feed array and/or the second feed array, or the phase difference between the beam of the first feed array and the beam of the second feed array, so that a third beam and a fourth beam that are formed after the third planar array reflects or transmits the beam in the second polarization direction can be respectively received by the first feed array and the second feed array, where the first polarization direction is different from the second polarization direction.

In a possible implementation, the polarization direction of the first feed array is a horizontal polarization direction, and the polarization direction of the second feed array is a vertical polarization direction; or the polarization direction of the first feed array is a left-hand circular polarization direction, and the polarization direction of the second feed array is a right-hand circular polarization direction.

In a possible implementation, the first polarization direction is any one of linear polarization, circular polarization, or elliptical polarization, and the second polarization direction is any one of linear polarization, circular polarization, or elliptical polarization.

In a possible implementation, the adjusting the phase centers/center of the beams/beam of the first feed array and/or the second feed array includes: controlling the first feed array to perform beam sweeping, so that the phase center of the beam of the first feed array is deflected; and/or controlling the second feed array to perform beam sweeping, so that the phase center of the beam of the second feed array is deflected.

In a possible implementation, the adjusting the beam widths/width of the beams/beam of the first feed array and/or the second feed array includes: controlling the first feed array to disable or enable at least one unit; and/or controlling the second feed array to disable or enable at least one unit.

In a possible implementation, a phase-adjustable component is disposed in a first direction of each unit of the third planar array; and the adjusting a phase difference between the beam of the first feed array and the beam of the second feed array includes: adjusting an electrical parameter of the phase-adjustable component of each unit, where the electrical parameter is used to control an electrical length of a unit of the third planar array.

In a possible implementation, before the adjusting one or more of the phase centers/center of the beams/beam of the first feed array and/or the second feed array, the beam widths/width of the beams/beam of the first feed array and/or the second feed array, or the phase difference between the beam of the first feed array and the beam of the second feed array, the method further includes: detecting an amplitude and a phase of the beam of the first feed array and an amplitude and a phase of the beam of the second feed array, and determining adjustment coefficients/an adjustment coefficient of the phase centers/center of the beams/beam of the first feed array and/or the second feed array, or determining adjustment coefficients/an adjustment coefficient of the beam widths/width of the beams/beam of the first feed array and/or the second feed array, or determining an adjustment coefficient of the phase difference between the beam of the first feed array and the beam of the second feed array.

According to a sixth aspect, a communication apparatus is provided. The apparatus includes a module configured to perform the method according to any one of the fourth aspect or the possible implementations of the fourth aspect.

For example, the apparatus may include: a processing module, configured to control a phase center of a beam of a first feed array to be at a first position and a beam width to be a first width, control a phase center of a beam of a second feed array to be at a second position and a beam width to be a second width, and control a phase difference between the beam of the first feed array and the beam of the second feed array to be a first phase difference, so that the beam of the first feed array and the beam of the second feed array form a beam in a first polarization direction after being reflected or transmitted by a third planar array; and a sending module, configured to send the beam in the first polarization direction to the outside.

The processing module is further configured to adjust one or more of the phase centers/center of the beams/beam of the first feed array and/or the second feed array, the beam widths/width of the beams/beam of the first feed array and/or the second feed array, or the phase difference between the beam of the first feed array and the beam of the second feed array, so that the beam of the first feed array and the beam of the second feed array form a beam in a second polarization direction after being reflected or transmitted by the third planar array, where the first polarization direction is different from the second polarization direction.

The sending module is further configured to send the beam in the second polarization direction to the outside.

According to a seventh aspect, a communication apparatus is provided. The apparatus includes a module configured to perform the method according to any one of the fifth aspect or the possible implementations of the fifth aspect.

For example, the apparatus may include: a processing module, configured to: when a third planar array receives a beam in a first polarization direction, control a phase center of a beam of a first feed array to be at a first position and a beam width to be a first width, control a phase center of a beam of a second feed array to be at a second position and a beam width to be a second width, and control a phase difference between the beam of the first feed array and the beam of the second feed array to be a first phase difference, so that a first beam and a second beam that are formed after the third planar array reflects or transmits the beam in the first polarization direction can be respectively received by the first feed array and the second feed array; and a receiving module, configured to receive the first beam and the second beam.

The processing module is further configured to: when the third planar array receives a beam in a second polarization direction, adjust one or more of phase centers/a phase center of the beams/beam of the first feed array and/or the second feed array, beam widths/a beam width of the beams/beam of the first feed array and/or the second feed array, or the phase difference between the beam of the first feed array and the beam of the second feed array, so that a third beam and a fourth beam that are formed after the third planar array reflects or transmits the beam in the second polarization direction can be respectively received by the first feed array and the second feed array, where the first polarization direction is different from the second polarization direction.

The receiving module is further configured to receive the third beam and the fourth beam.

According to an eighth aspect, an embodiment of this application provides a communication apparatus, including a processor and a communication interface. The communication interface is configured to communicate with another communication apparatus. The processor is configured to run a group of programs, so that the method according to any one of the fourth aspect or the possible implementations of the fourth aspect, or the method according to the fifth aspect or the possible implementations of the fifth aspect is implemented.

According to a ninth aspect, an embodiment of this application provides a computer-readable storage medium. The computer storage medium stores computer-readable instructions. When the computer-readable instructions are run on a communication apparatus, the method according to any one of the fourth aspect or the possible implementations of the fourth aspect, or the method according to the fifth aspect or the possible implementations of the fifth aspect is implemented.

According to a tenth aspect, an embodiment of this application provides a chip system. The chip system includes a processor, and may further include a memory, configured to implement the method according to any one of the fourth aspect or the possible implementations of the fourth aspect, or the method according to the fifth aspect or the possible implementations of the fifth aspect.

The chip system may include a chip, or include a chip and another discrete device.

According to an eleventh aspect, an embodiment of this application provides a computer program product, including instructions. When the computer program product runs on a computer, the computer is enabled to perform the method according to any one of the fourth aspect or the possible implementations of the fourth aspect, or the method according to the fifth aspect or the possible implementations of the fifth aspect.

DETAILED DESCRIPTION OF ILLUSTRATIVE EMBODIMENTS

Figure 1A:
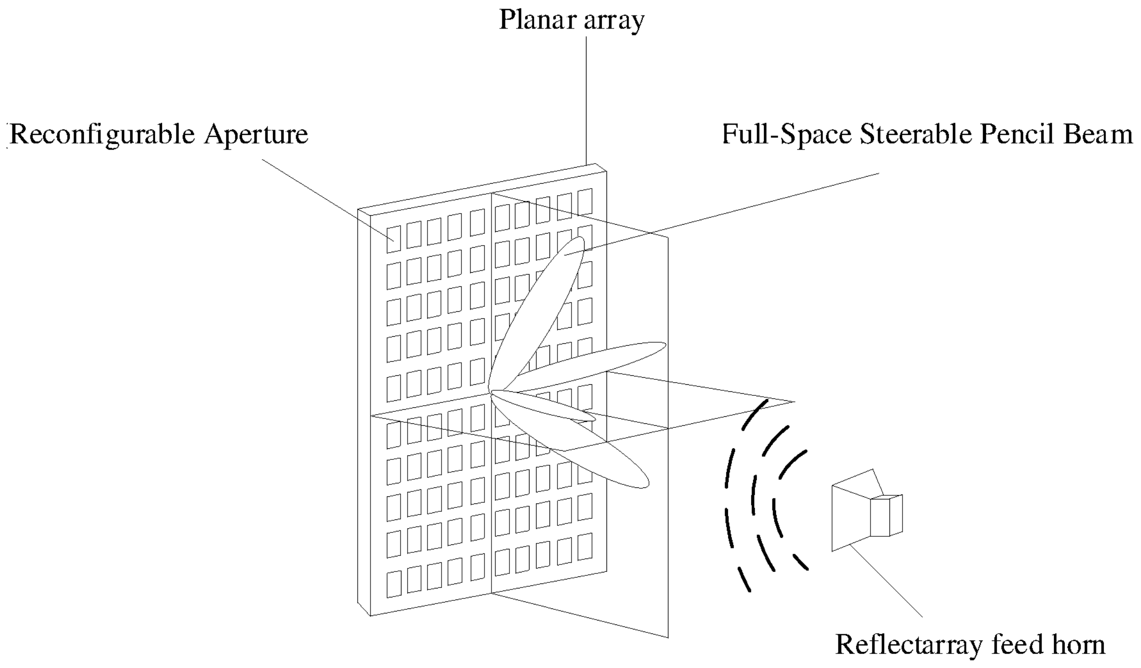
FIG. 1A is a possible schematic diagram of a reflection array antenna.
Figure 1B:
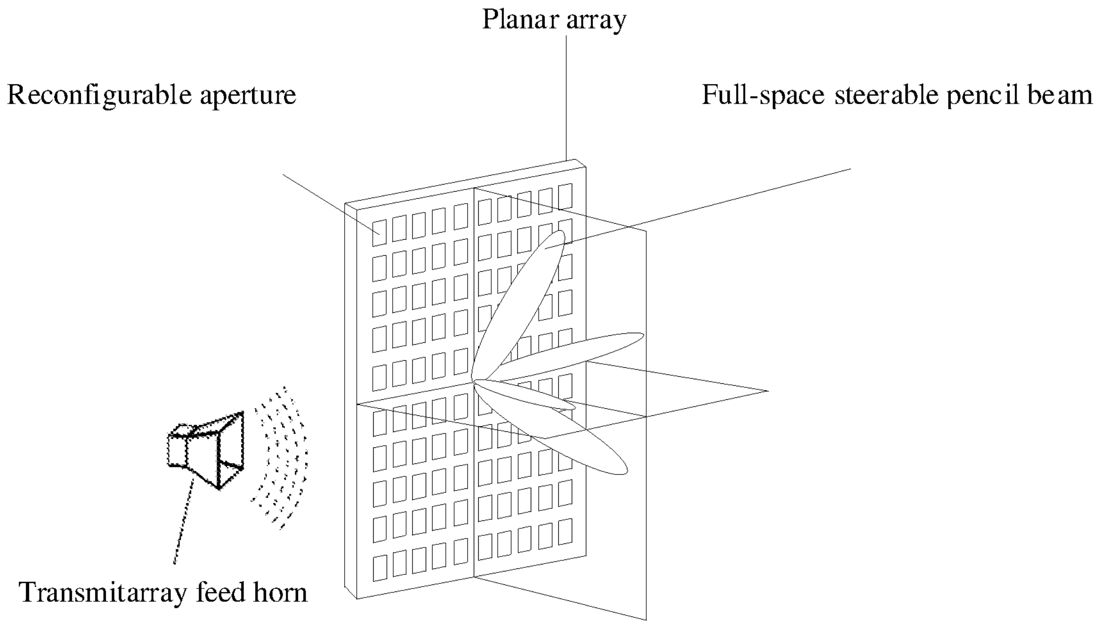
FIG. 1B is a possible schematic diagram of a transmission array antenna.

A reflection array antenna (or a transmission array antenna) is a new high-gain antenna formed by a feed and a planar array. In combination with advantages of a classic reflection plane antenna (or a transmission plane antenna) and a direct radiation array antenna, a reflection phase of each independent unit (that is, a reconfigurable aperture) on an array plane may be properly designed to implement a far-field beam of a specific shape or direction. The reflection array antenna (or the transmission array antenna) has developed rapidly in recent years due to advantages such as low power consumption, light weight, a high gain, low costs, and easy integration, has various antenna forms, and has a broad application prospect. FIG. 1A is a possible schematic diagram of a reflection array antenna. FIG. 1B is a possible schematic diagram of a transmission array antenna.

In a ground communication system, a linear polarization form is usually used for an antenna of a device. For example, a base station uses +/−45° linear polarization. However, in complex climate and electromagnetic environments, this single linearly polarized antenna cannot meet requirements of satellite communication, space detection, and radar for tracking and locating a target.

To improve polarization efficiency between transmit and receive antennas and avoid polarization mismatch, an application value of the reflection array antenna with a multi-polarization transformation function is highlighted. For example, circularly polarized antennas are used on a spacecraft moving at a high speed, so that the spacecraft can receive signals in any state. On a flight device, circularly polarized antennas can reduce signal leakage and attenuation, and can also eliminate polarization distortion caused by Faraday rotation in the ionosphere.

With the development of future space-ground integrated communication, a single terminal has a requirement for communication with a space-borne device, a ground base station, and the like. Therefore, a function of supporting arbitrary polarization by an antenna of the single terminal becomes an urgent requirement.

Figure 2A:
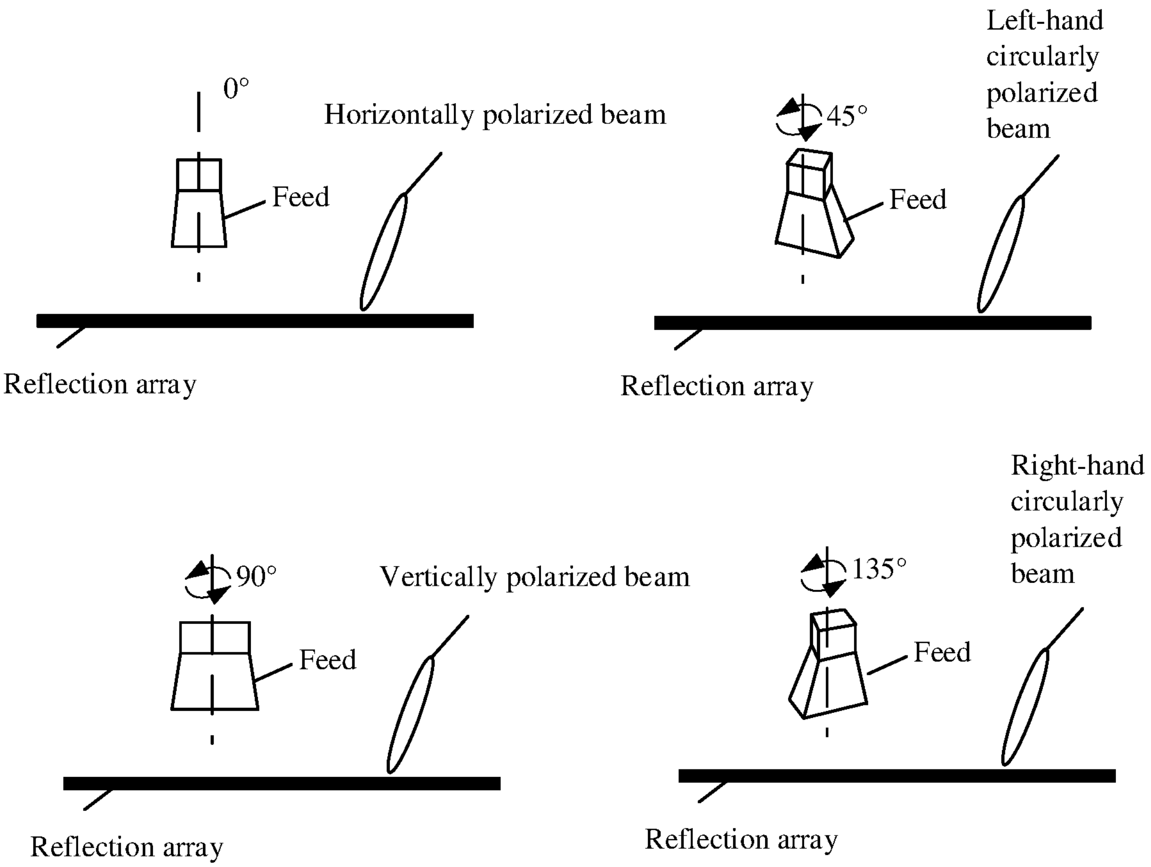
FIG. 2A is a schematic diagram of a technology of mechanically rotating a feed.

1. Technology of mechanically rotating a feed: If units in a fully polarized reflection array are entirely symmetric units and a feed is linear polarization incidence, a polarization direction of a beam of the feed can be adjusted by adjusting an angle of the feed, to implement an antenna system with arbitrary polarization. As shown in FIG. 2A, when the angle of the feed is rotated to 0°, 450, 90°, and 135°, horizontal polarization, left-hand circular polarization, vertical polarization, and right-hand circular polarization may be respectively implemented.

However, in this method, switching between a linearly polarized antenna and a circularly polarized antenna is implemented by mechanically rotating the feed, which is inconvenient in actual use. Especially when an antenna design is completed, a system rotation structure is complex and heavy, and implementation is difficult.

Figure 2B:
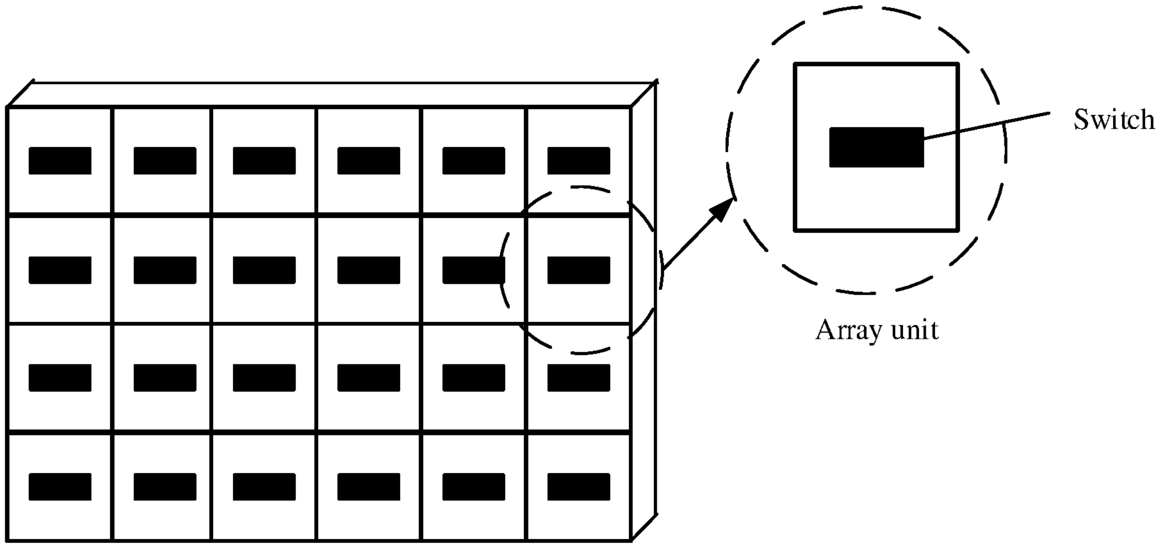
FIG. 2B is a schematic diagram of a technology of reconfiguring polarization of a reflection array unit.

2. Technology of reconfiguring polarization of a reflection array unit: A unit polarization characteristic of a reflection array surface in a reflection array antenna is adjusted to switch between circular polarization and linear polarization. As shown in FIG. 2B, a plurality of switches are added to a reflection array unit structure to implement polarization characteristic switching of the reflection array unit, so that linearly polarized and circularly polarized antenna systems can be separately implemented, and system complexity of feed rotation can be avoided.

However, there is no specific implementation method of arbitrary linear polarization and arbitrary elliptical polarization in the technology of reconfiguring polarization of the reflection array unit. In addition, during actual application, there are hundreds of reflection array units in the reflection array, and each switch needs to be controlled. This method is very inconvenient during actual application, and is difficult to implement. In addition, in the method, if the feed is not changed, only switching between horizontal polarization and vertical polarization, or switching between left-hand circular polarization and right-hand circular polarization is allowed. This has a limitation and cannot actually support arbitrary polarization switching.

It can be learned that, although the technology of mechanically rotating the feed or the technology of reconfiguring polarization of the reflection array unit can implement reconfigurable circular polarization and linear polarization, it is inconvenient to implement arbitrary polarization in the technology of mechanically rotating the feed in actual use, and the technology of reconfiguring polarization of the reflection array unit requires a large quantity of switches and control lines, and the implementation is also very complex.

Based on this, embodiments of this application provide a method for controlling an antenna polarization direction and an antenna system. Abeam width and/or a phase center of a dual-linearly polarized or dual-circularly polarized feed array are/is adjusted in an electrical control manner, to change a reflection beam gain (a reflection array) or a transmission beam gain (a transmission array) of a periodically adjustable planar array, and further form any linearly polarized or any circularly polarized reflection array or transmission array. Further, a phase-adjustable component (such as a variable diode or an adjustable capacitor) may be further disposed on a unit structure of an adjustable reflection (transmission) array surface, to compensate for a phase of a beam emitted by a dual-linearly polarized or dual-circularly polarized feed array, to achieve an effect of adjusting a phase difference of the dual-linearly polarized or dual-circularly polarized feed array, thereby forming arbitrary elliptical polarization.

It should be understood that embodiments of this application may be applied to various devices, for example, may be applied to a terminal, a base station, or a satellite-borne device that requires arbitrary polarization in future space-ground integrated communication.

Figure 3A:
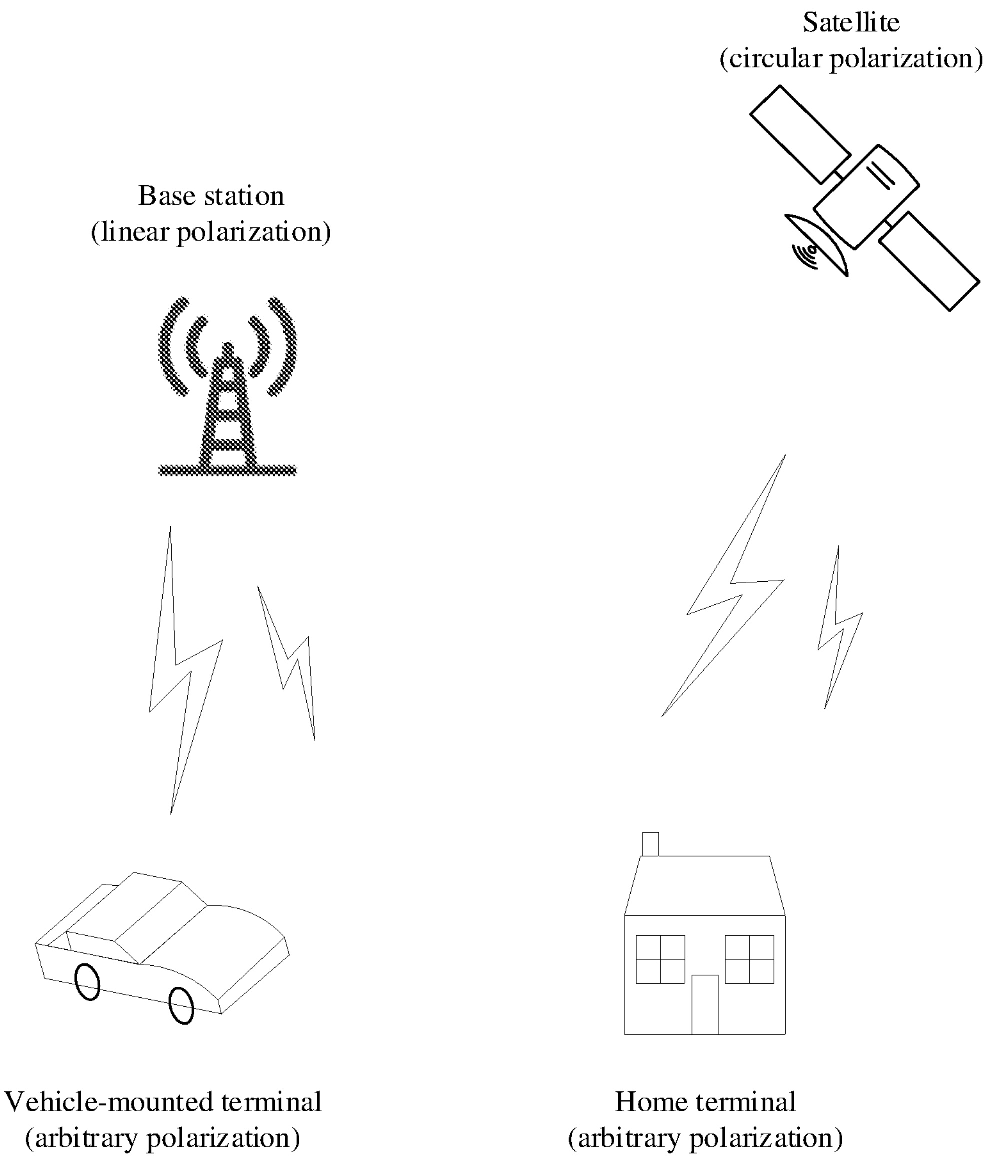
FIG. 3A shows a possible application scenario according to an embodiment of this application.

For example, FIG. 3A shows a possible application scenario according to an embodiment of this application. An antenna system supporting arbitrary polarization is used in a vehicle-mounted terminal or a home terminal. An antenna system of a base station supports linear polarization, an antenna system of a satellite supports circular polarization, and an antenna system of the vehicle-mounted terminal and the home terminal supports arbitrary polarization, so that the vehicle-mounted terminal and the home terminal can communicate with the base station in a linear polarization manner, and can also communicate with the satellite in a circular polarization manner.

Figure 3B:
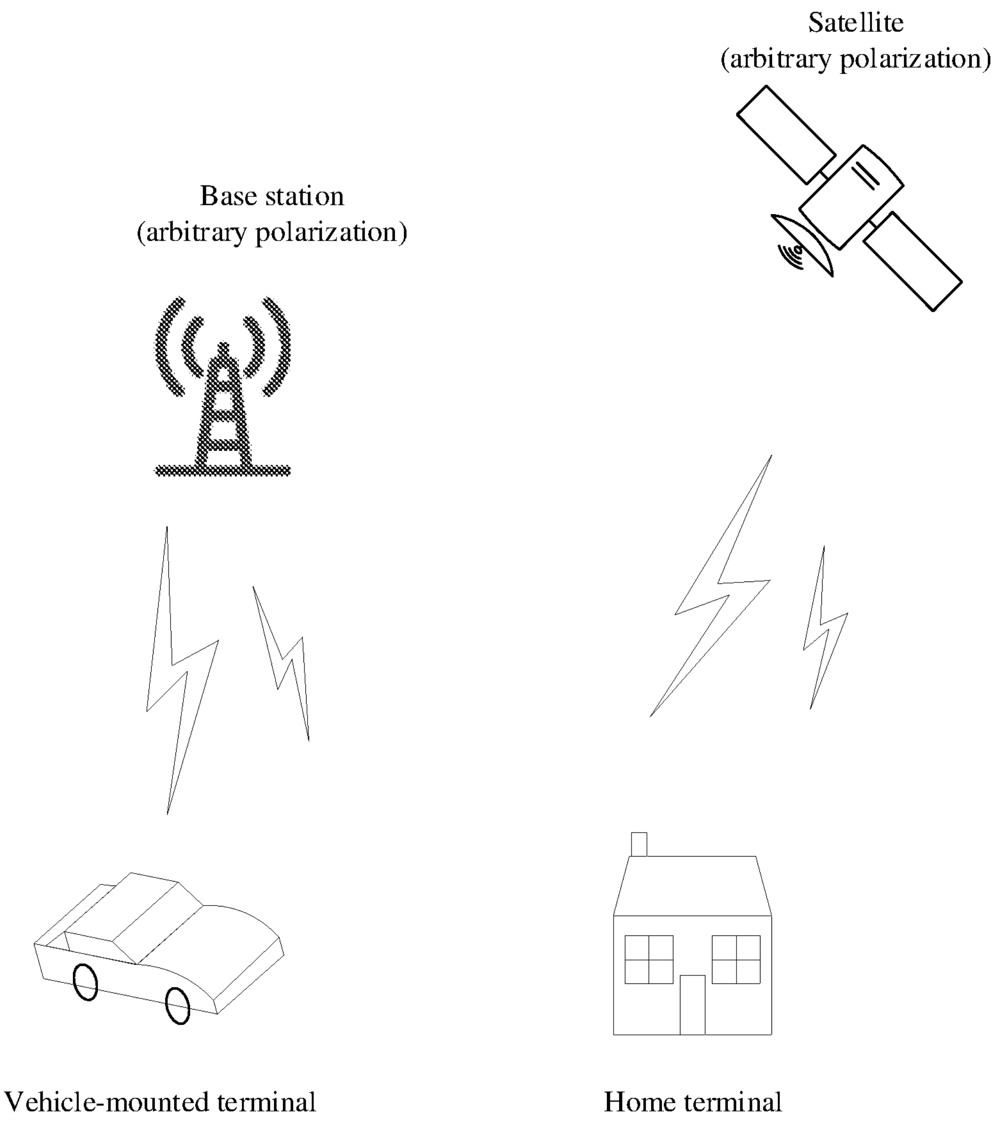
FIG. 3B shows another possible application scenario according to an embodiment of this application.

For example, FIG. 3B shows another possible application scenario according to an embodiment of this application. An antenna system supporting arbitrary polarization is used in a base station and a satellite. The antenna system of the base station and the satellite supports any polarization manner, so that the base station and the satellite can communicate with a device in any polarization manner, for example, communicate with a base station in a linear polarization manner, and communicate with a home terminal in a circular polarization manner or a linear polarization manner.

Certainly, FIG. 3A and FIG. 3B are merely two examples of application scenarios of this application, but are not limited thereto. During actual application, a possibility of another application scenario is not excluded.

To make objectives, technical solutions, and advantages of embodiments of this application clearer, the following further describes the technical solutions in embodiments of this application in detail with reference to the accompanying drawings.

The terms "system" and "network" may be used interchangeably in embodiments of this application. "At least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" usually represents an "or" relationship between associated objects. "At least one of the following items (pieces)" or a similar expression thereof refers to any combination of these items, including any combination of singular items (pieces) or plural items (pieces). For example, at least one of a, b, or c may indicate a, b, c, a and b, b and c, a and c, or a, b, and c.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, a first priority criterion and a second priority criterion are merely used to distinguish between different criteria, but do not indicate different content, priorities, importance, or the like of the two criteria.

In addition, the terms "include" and "have" in embodiments, claims, and accompanying drawings of this application are not exclusive. For example, a process, a method, a system, a product, or a device including a series of steps or modules is not limited to the listed steps or modules, and may further include steps or modules that are not listed.

Figure 4:
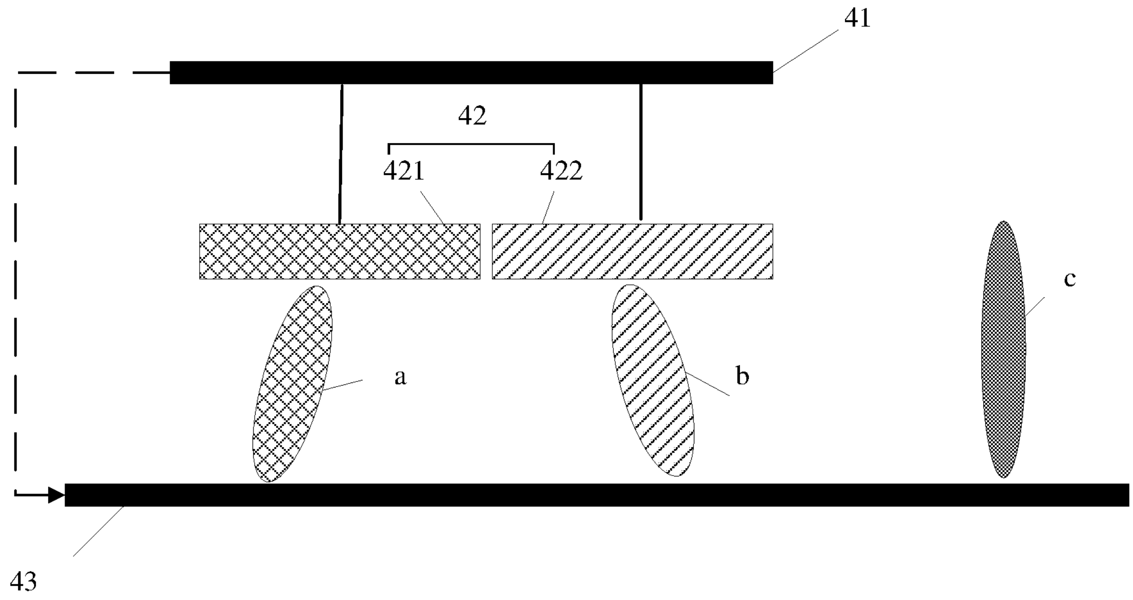
FIG. 4 is a schematic structural diagram of an antenna system according to an embodiment of this application.

FIG. 4 is a schematic structural diagram of an antenna system according to an embodiment of this application. The antenna system includes at least one processor 41 (where one processor 41 is used as an example in FIG. 4), a dual-feed array 42, and a third planar array 43. The dual-feed array 42 further includes a first feed array 421 and a second feed array 422, and a polarization direction of the first feed array 421 is orthogonal to a polarization direction of the second feed array 422.

In a possible design, the dual-feed array 42 is a dual-circularly polarized array. The polarization direction of the first feed array 421 is a left-hand circular polarization direction, and the polarization direction of the second feed array 422 is a right-hand circular polarization direction; or the polarization direction of the second feed array 421 is a left-hand circular polarization direction, and the polarization direction of the first feed array 421 is a right-hand circular polarization direction.

In another possible design, the dual-feed array 42 is a dual-linearly polarized array. The polarization direction of the first feed array 421 is a horizontal polarization direction, and the polarization direction of the second feed array 422 is a vertical polarization direction; or the polarization direction of the first feed array 421 is a vertical polarization direction, and the polarization direction of the second feed array 422 is a horizontal polarization direction.

Certainly, the foregoing two designs are merely examples of the polarization direction of the first feed array 421 and the polarization direction of the second feed array 422, but are not limitations. During actual application, a possibility of another implementation is not excluded.

In a possible design, the third planar array 43 is a transmission array. When the antenna system transmits a beam, a beam a from the first feed array 421 and a beam b from the second feed array 422 form a beam c after being transmitted by the third planar array 43, and the beam c is sent to the outside. When the antenna system receives a beam, a beam c from the outside forms beams a and b after being transmitted by the third planar array 43, and the beams are respectively received by the first feed array 421 and the second feed array 422.

In another possible design, the third planar array 43 is a reflection array. When the antenna system transmits a beam, a beam a from the first feed array 421 and a beam b from the second feed array 422 form a beam c after being reflected by the third planar array 43, and the beam c is sent to the outside. When the antenna system receives a beam, a beam c from the outside forms beams a and b after being reflected by the third planar array 43, and the beams are respectively received by the first feed array 421 and the second feed array 422.

For ease of description, in the following, an example in which the third planar array 43 is a reflection array is mainly used. As shown in FIG. 4, the third planar array 43 reflects the beams a and b to form a synthetic beam c.

Still refer to FIG. 4. The processor 41 is electrically connected to both the first feed array 421 and the second feed array 422, so that the processor 41 may send control instructions to the first feed array 421 and the second feed array 422, to control phase centers and beam widths of a beam of the first feed array 421 and a beam of the second feed array 422.

Optionally, the processor 41 may further control an initial phase difference between the beam of the first feed array 421 and the beam of the second feed array 422 (that is, adjust a phase difference between the beams a and b when the beams a and b are emitted from the dual-feed array 42).

Optionally, the processor 41 may be further electrically connected to the third planar array 43, to control a phase modulation parameter of each array unit (where the "array unit" is briefly referred to as a "unit" in this specification) in the third planar array for an incident beam (that is, a beam incident to each unit), further compensate for a phase of the beam of the first feed array 421 and/or a phase of the beam of the second feed array 422, and adjust a phase difference of the beams a and b at the third planar array 43 after being emitted from the dual-feed array 42.

The processor 41 controls one or more of the phase center, the beam width, or the phase difference of the dual-feed array 42, so that the antenna system can transmit a beam in any polarization direction to the outside or receive a beam in any polarization direction from the outside.

The following describes a principle of implementing arbitrary polarization when the dual-feed array 42 is dual-linearly polarized.

$\vec{E}(z,t)=\vec{a}_x E_x\cos(\omega t-kz+\emptyset_x)+\vec{a}_y E_y\cos(\omega t-kz+\emptyset_y)$ For two linearly polarized beams that are placed orthogonally, Z direction is used as a propagation direction, and polarization directions are respectively X direction and Y direction, and a synthetic electric field may satisfy the following formula:

$$\vec{E}(z,t)=\vec{a}_x E_x\cos(\omega t-kz+\emptyset_x)+\vec{a}_y E_y\cos(\omega t-kz+\emptyset_y).$$

There are several cases below:

When $\emptyset_x=\emptyset_y$ or a difference is $\pi$, $\vec{E}(z, t)$ is a linearly polarized beam whose included angle between a polarization direction and the x-axis is arctan $$\left(\frac{E_x}{E_y}\right).$$

When a difference is $\pi/2$ or $3\pi/2$, $E_x$ and $E_y$ are equal and $E_x$ is 90° ahead of $E_y$, and $\vec{E}(z, t)$ is a right-hand circularly polarized beam.

When a difference is $\pi/2$ or $3\pi/2$, $E_x$ and $E_y$ are equal and $E_x$ is 900 behind $E_y$, and $\vec{E}(z, t)$ is a left-hand circularly polarized beam.

When $\emptyset_x$ and $\emptyset_y$ are not equal, $E_x$ and $E_y$ are not equal, and $E_x$ is ahead of $E_y$, $\vec{E}(z, t)$ is a right-hand elliptically polarized beam.

When $\emptyset_x$ and $\emptyset_y$ are not equal, $E_x$ and $E_y$ are not equal, and $E_x$ is behind $E_y$, $\vec{E}(z, t)$ is a left-hand elliptically polarized beam.

Therefore, amplitudes and phases of the two linearly polarized beams that are placed orthogonally may be controlled to obtain any linearly polarized beam, circularly polarized beam, and elliptically polarized beam.

Figure 5A:
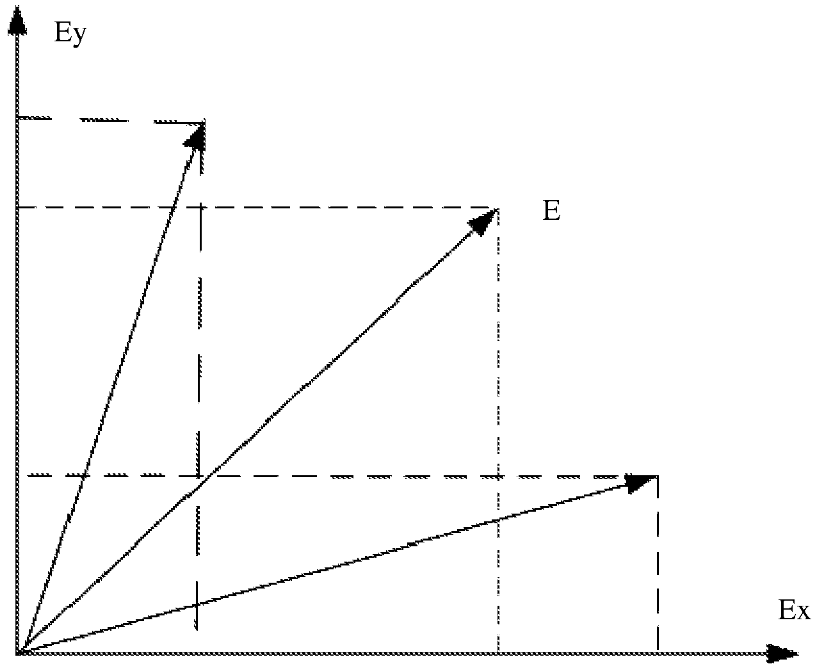
FIG. 5A is a diagram of a principle that two orthogonally linearly polarized beams implement an arbitrary linearly polarized beam.
Figure 5B:
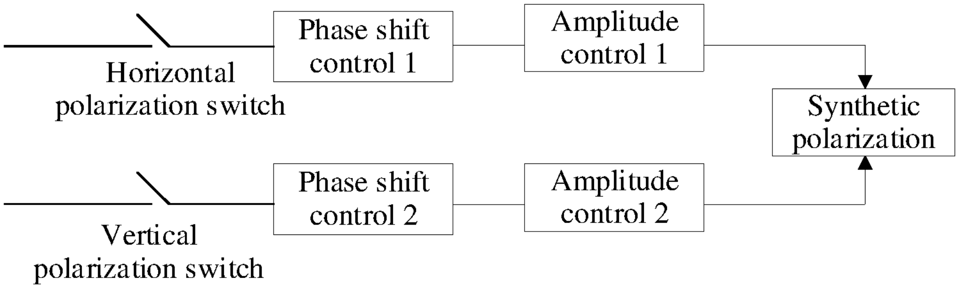
FIG. 5B is a block diagram of implementing dual-linear polarization synthesis into arbitrary polarization.

FIG. 5A is a diagram of a principle that two orthogonally linearly polarized beams implement any linearly polarized beam. FIG. 5B is a block diagram of implementing dual-linear polarization synthesis into arbitrary polarization. Table 1 s an example of synthetic polarization in several control manners in the implementation block diagram shown in FIG. 5B.

TABLE 1

| Horizontal polarization switch | Vertical polarization switch | Phase relationship between horizontal polarization and vertical polarization | Horizontal and vertical amplitude relationship | Synthetic polarization |
|---|---|---|---|---|
| On | Off | / | / | Horizontal polarization |
| Off | On | / | / | Vertical polarization |
| On | On | o or π | Unequal | Arbitrary linear polarization |
| On | On | π/2 | Equal | Right-hand circular polarization |
| On | On | −π/2 | Equal | Left-hand circular polarization |
| On | On | / | Unequal | Elliptical polarization |

The following describes a principle of implementing arbitrary polarization when the dual-feed array 42 is dual-circularly polarized.

$$\vec{E}(z,t)=E_m\left[\vec{a}_x(1+\cos\Delta\emptyset+j\sin\Delta\emptyset)-\vec{a}_y\frac{\sin\Delta\emptyset}{1+\cos\Delta\emptyset}(1+\cos\Delta\emptyset+j\sin\Delta\emptyset)\right]e^{-j(kz-\emptyset_0)}.$$

For two circularly polarized beams that are placed in an overlapping manner, Z direction is used as a propagation direction, and polarization directions are respectively X direction and Y direction, and a synthetic electric field may satisfy the following formula:

$$\vec{E}(z,t) = E_m\left[\vec{a}_x(1+\cos\Delta\phi + j\sin\Delta\phi) - \vec{a}_y\frac{\sin\Delta\phi}{1+\cos\Delta\phi}(1+\cos\Delta\phi + j\sin\Delta\phi)\right]e^{-j(kz-\phi_0)}.$$

When the first term $E_m[\vec{a}_x(1+\cos\Delta\emptyset+j\sin\Delta\emptyset)]e^{-j(kz-\emptyset_0)}$ is separately excited, $\vec{E}(z, t)$ is a right-hand circularly polarized beam.

When the second term $$E_m\left[\vec{a}_y\frac{\sin\Delta\phi}{1+\cos\Delta\phi}(1+\cos\Delta\phi + j\sin\Delta\phi)\right]e^{-j(kz-\phi_0)}$$

is separately excited, $\vec{E}(z, t)$ is a left-hand circularly polarized beam.

When both the first term and the second term are excited and amplitudes are equal, $\vec{E}(z, t)$ is a linearly polarized beam whose included angle between a polarization direction and the x-axis is arctan $$\left(\frac{-\sin\Delta\phi}{1+\cos\Delta\phi}\right).$$

When both the first term and the second term are excited and amplitudes are not equal, $\vec{E}(z, t)$ is an elliptically polarized beam.

Therefore, amplitudes of the two circularly polarized beams that are placed in the overlapping manner can be controlled to obtain any linearly polarized beam, elliptically polarized beam, and circularly polarized beam.

Figure 6:
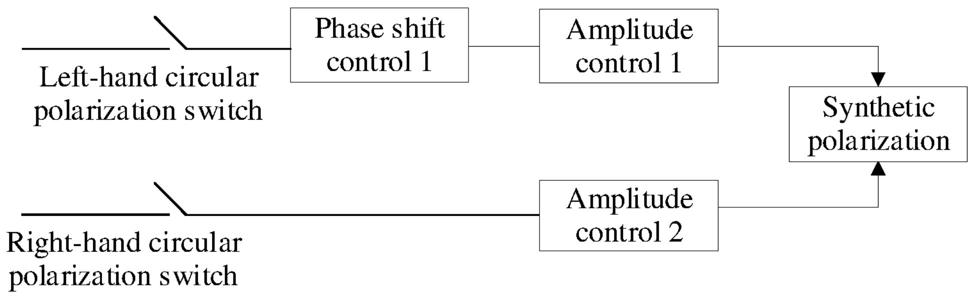
FIG. 6 is a block diagram of implementing dual-circular polarization synthesis into arbitrary polarization.

FIG. 6 is a block diagram of implementing dual-circular polarization synthesis into arbitrary polarization. Table 2 is an example of synthetic polarization in several control manners in the implementation block diagram shown in FIG. 6. It should be understood that, in FIG. 6, an example in which ΔØ (an initial phase difference) is controlled by using a phase shift control 2 on a vertical polarization channel is used as an example. Actually, ΔØ may alternatively be controlled on a horizontal polarization channel. This is not limited in this application.

TABLE 2

| Left-hand circular polarization switch | Right-hand circular polarization switch | Phase relationship between left-hand and right-hand circular polarization | Amplitude relationship between right-hand and left-hand circular polarization | Synthetic polarization |
|---|---|---|---|---|
| On | Off | / | / | Left-hand circular polarization |
| Off | On | / | / | Right-hand circular polarization |
| On | On | / | Equal | Arbitrary linear polarization |
| On | On | / | Unequal | Elliptical polarization |

The following describes a phase center of an antenna (beam).

After an electromagnetic wave radiated by an antenna is away from the antenna for a specific distance, an equal-phase surface of the electromagnetic wave is approximately a sphere, and a sphere center of the sphere is an equivalent phase center of the antenna. If beam directions are inconsistent, the phase center changes to some extent.

Figure 7:
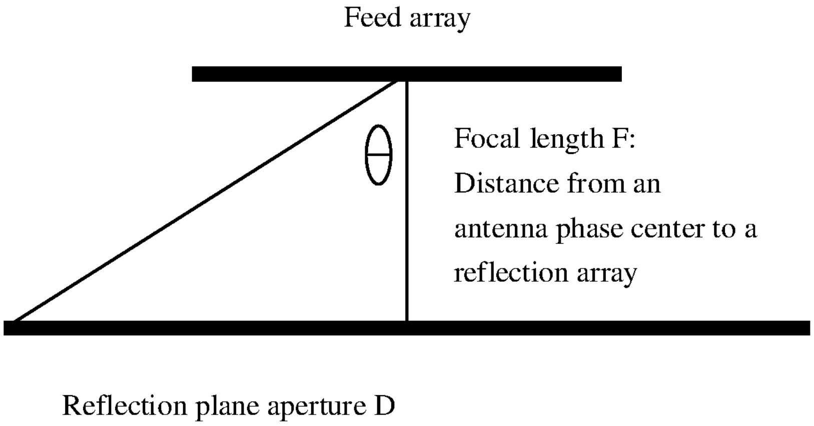
FIG. 7 is a schematic diagram of a focal length and an aperture of a reflection (transmission) array antenna.

A phase center in a reflection (transmission) array antenna is a distance between a feed array and a reflection array, as shown in FIG. 7. Table 3 shows gain values corresponding to different F/D values. It can be learned from Table 3 that, a gain of a reflection array antenna whose F/D is equal to 0.5 is largest, and when a phase center changes, the gain changes.

TABLE 3

| | F/D | | | | | | | | | |
|---|---|---|---|---|---|---|---|---|---|---|
| | 0.1 | 0.2 | 0.3 | 0.4 | 0.5 | 0.6 | 0.7 | 0.8 | 0.9 | 1 |
| Gain (dB) | 13.15 | 13.8 | 15.45 | 19.16 | 20.98 | 20.3 | 17.95 | 16.41 | 15.38 | 13 |

The following describes a relationship between aperture efficiency, a phase center, and a beam width in an antenna system.

For a same reflection array surface, different aperture efficiency (where the aperture efficiency is a ratio of an effective aperture to a physical aperture of an antenna) corresponds to different antenna gains, affecting different beam electric field values. Therefore, an amplitude value required for arbitrary linear polarization or elliptical polarization may be obtained. For each designed antenna system, antenna aperture efficiency is related to a phase center of a feed array and a beam width of a feed.

Figure 8A:
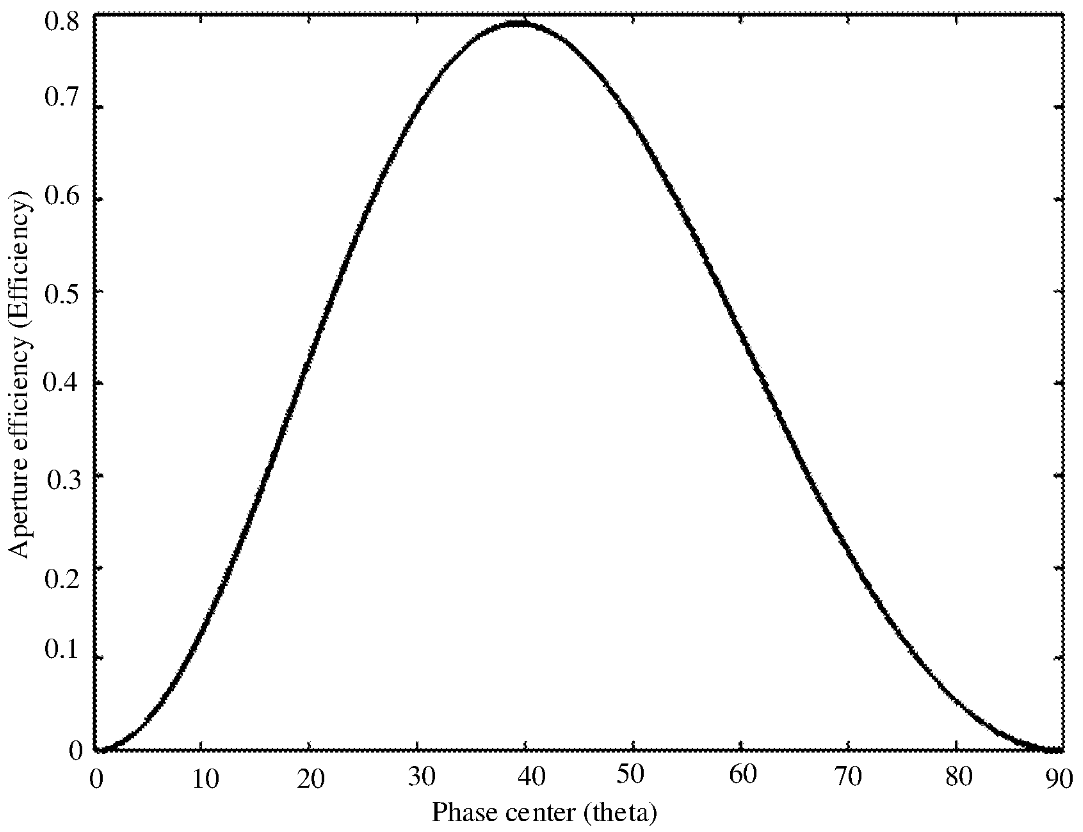
FIG. 8A is a schematic diagram in which different phase centers correspond to different aperture efficiency.

FIG. 8A is a schematic diagram in which different phase centers (theta) correspond to different aperture efficiency. It can be learned that the aperture efficiency varies with the phase center. When the phase center is about 40°, a gain is largest, and the aperture efficiency gradually decreases in a direction less than or greater than 40°.

Figure 8B:
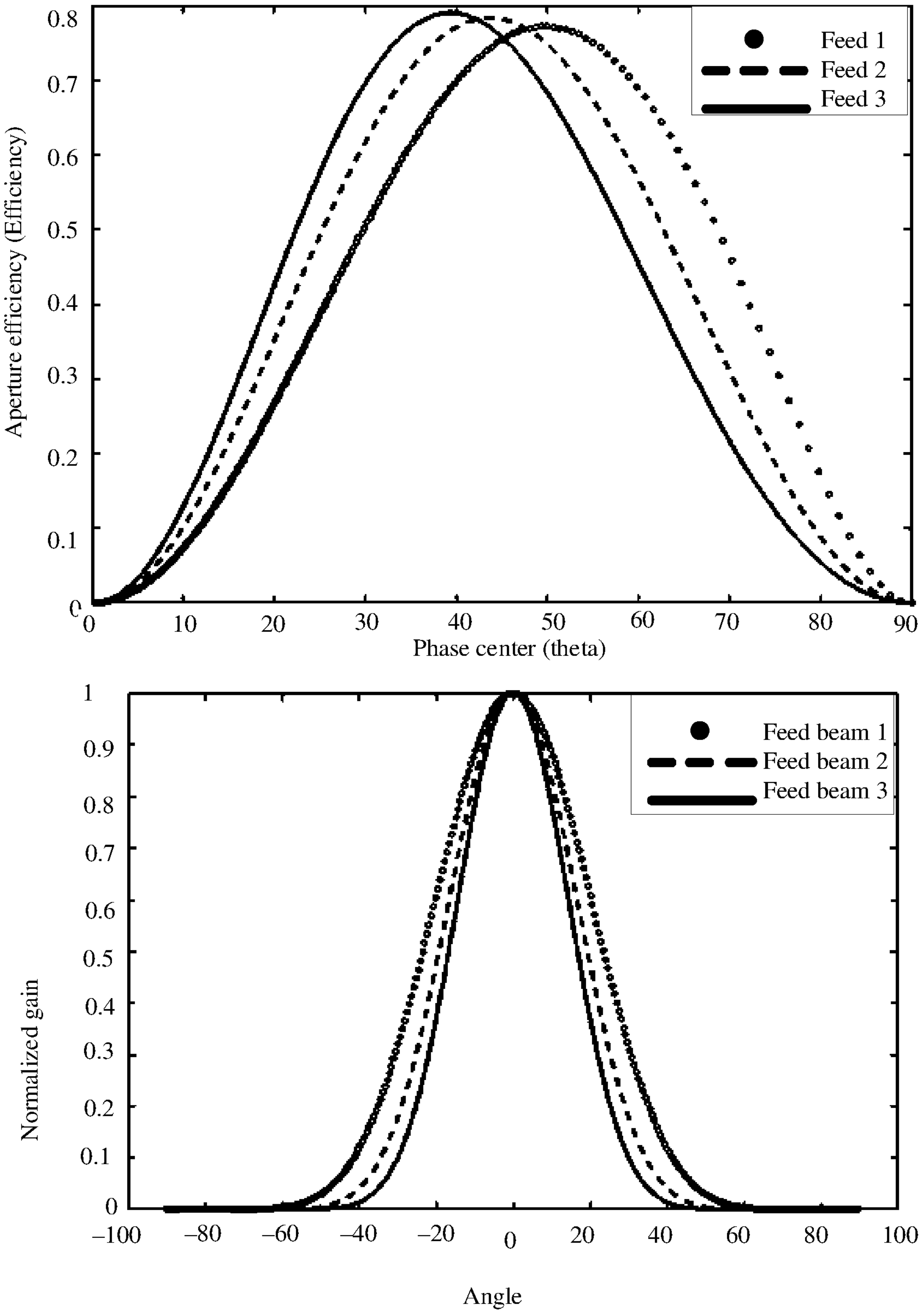
FIG. 8B is a schematic diagram in which different feed beam widths correspond to different aperture efficiency.

FIG. 8B is a schematic diagram in which different feed beam widths correspond to different aperture efficiency. It can be learned that a beam width of a feed 1>a beam width of a feed 2>a beam width of a feed 3, and aperture efficiency of the feed 3>aperture efficiency of the feed 2>aperture efficiency of the feed 1.

It can be learned from the foregoing related descriptions (in the embodiments shown in FIG. 5A and FIG. 5B, FIG. 6 and FIG. 7, and FIG. 8A and FIG. 8B) that, the processor 41 controls a change of the phase centers/center of the first feed array 421 and/or the second feed array 422, which may cause a change of the aperture efficiency, and further change the beam amplitude of the reflection (transmission) beam of the third planar array 43, that is, changing the phase center may change an amplitude change required for arbitrary polarization. The processor 41 controls a change of the beam widths/width of the first feed array 421 and/or the second feed array 422, which may also cause a change of the aperture efficiency, and further change the beam amplitude of the reflection (transmission) beam of the third planar array 43, that is, changing the beam width changes an amplitude change required for arbitrary polarization. Therefore, in this embodiment of this application, the processor 41 can control, by controlling the phase center and/or the beam width of the dual-feed array 42, the amplitude change required for arbitrary polarization, to implement arbitrary linear polarization or circular polarization.

The phase difference between the first feed array 421 and the second feed array 422 may be controlled by setting phase shift control modules on radio frequency channels corresponding to the first feed array 421 and the second feed array 422 (as shown in FIG. 5B and FIG. 6), to form arbitrary elliptical polarization. In addition, a phase-adjustable component (for example, a variable diode, an adjustable capacitor, or another adjustable potential) may be further disposed on the array unit of the third planar array, and an electrical parameter (for example, a current, a voltage, or a capacitor) of the phase-adjustable component is controlled, to control a phase modulation parameter (for example, a shape and/or a size of a unit) of each unit in the third planar array for a beam (that is, a beam incident to each unit), and further compensate for the phase of the first feed array 421 and/or the phase of the second feed array 422. Therefore, the phase difference between the first feed array 421 and the second feed array 422 is adjusted, to form arbitrary elliptical polarization.

Figure 9:
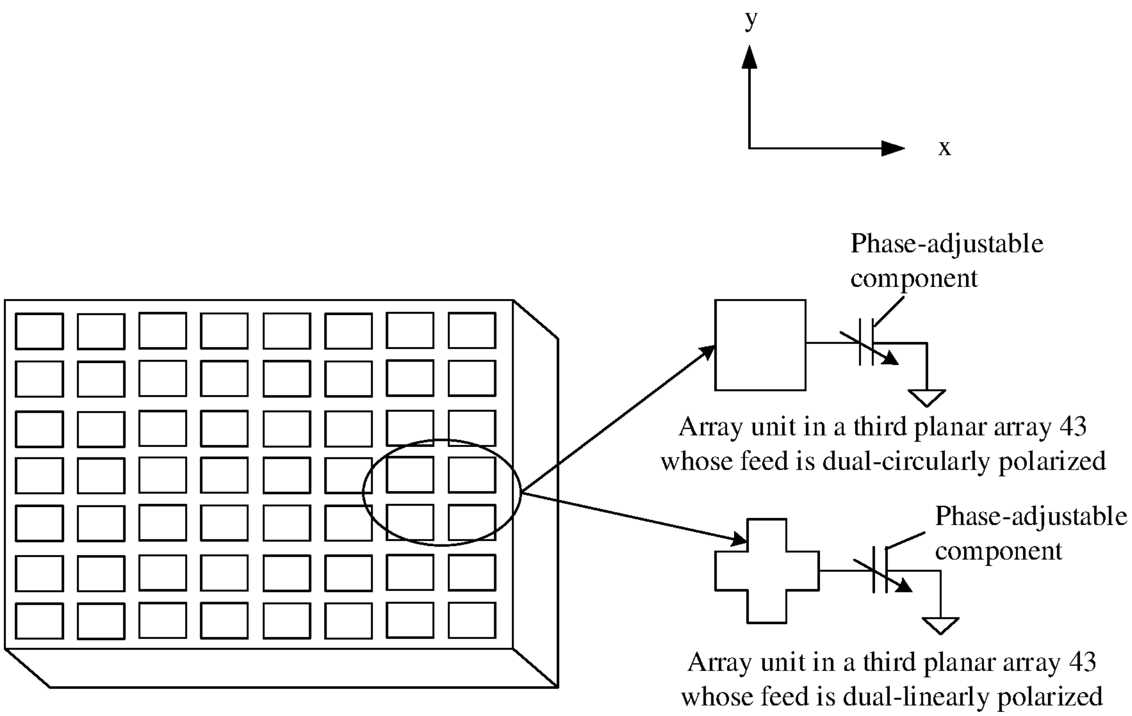
FIG. 9 is a schematic diagram of a phase-adjustable component disposed on an array unit of a third planar array.

FIG. 9 is a schematic diagram of loading an adjustable capacitor in the x direction of an array unit of a third planar array. When the feed array 42 is dual-circularly polarized, a shape of the array unit is a rectangle. When the feed array 42 is dual-linearly polarized, a shape of the array unit is a cross (certainly, this is merely an example, and actually, there may alternatively be another shape). A capacitance value of the adjustable capacitor is adjusted, so that a length of the array unit in the x direction may be increased or decreased, to change a size of the array unit, and further adjust a phase of a beam incident to the unit.

The foregoing describes a principle of forming arbitrary polarization in the antenna system provided in embodiments of this application. The following describes a method used by an antenna system to transmit a beam to the outside provided in embodiments of this application.

Figure 10:
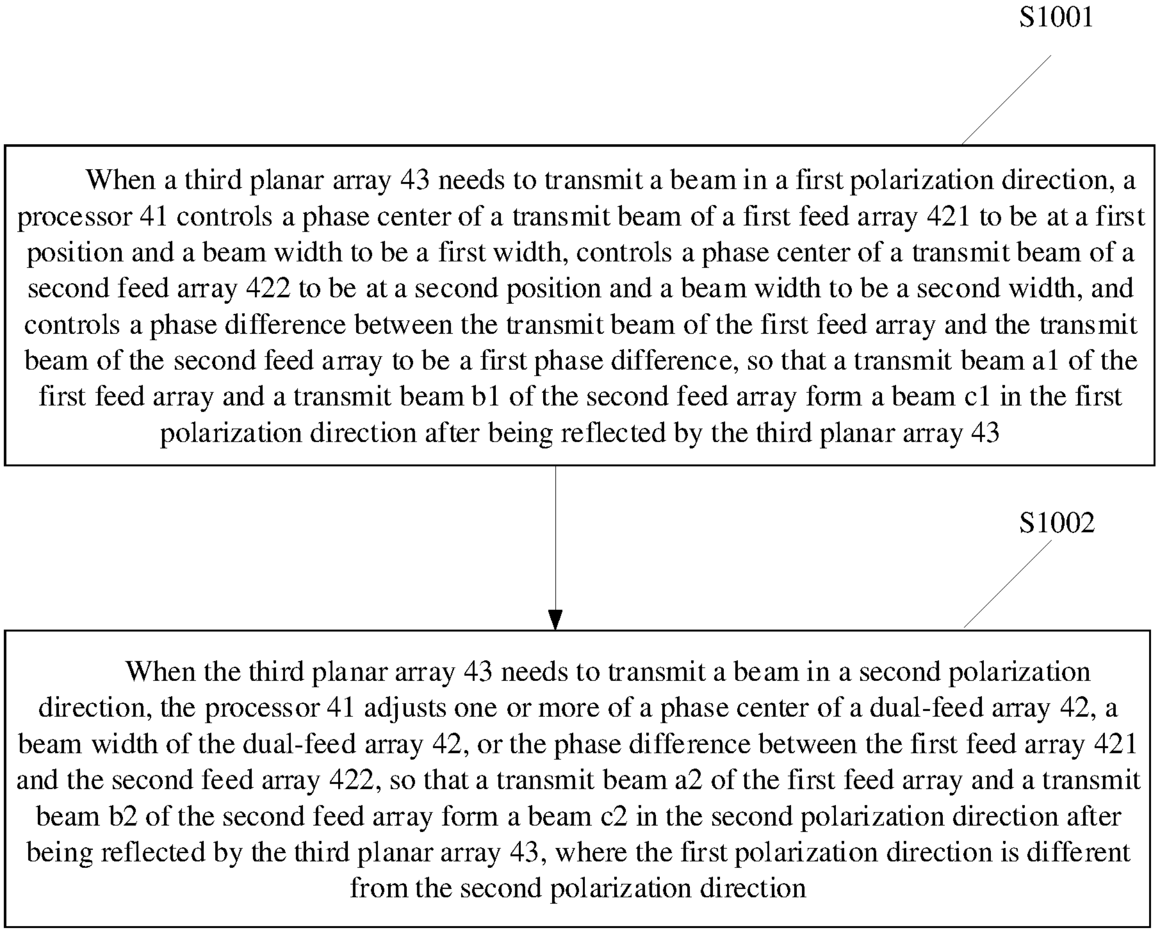
FIG. 10 is a flowchart of a method for controlling an antenna polarization direction according to an embodiment of this application.

FIG. 10 shows a method for controlling an antenna polarization direction according to an embodiment of this application. The method may be applied to the antenna system shown in FIG. 4. The method includes the following steps.

S1001: When a third planar array 43 needs to transmit a beam in a first polarization direction, a processor 41 controls a phase center of a transmit beam of a first feed array 421 to be at a first position and a beam width to be a first width, controls a phase center of a transmit beam of a second feed array 422 to be at a second position and a beam width to be a second width, and controls a phase difference between the transmit beam of the first feed array and the transmit beam of the second feed array to be a first phase difference, so that a transmit beam a1 of the first feed array and a transmit beam b1 of the second feed array form a beam c1 in the first polarization direction after being reflected by the third planar array 43.

It should be understood that the polarization direction in this specification includes types such as circular polarization, linear polarization (including horizontal polarization, vertical polarization, and linear polarization in another direction), and elliptical polarization. The first polarization direction herein may be any one of the circular polarization, the linear polarization, or the elliptical polarization.

A correspondence between the first polarization direction and the phase center, the beam width, or the phase difference may be obtained according to the foregoing related descriptions, and details are not described herein again.

S1002: When the third planar array 43 needs to transmit a beam in a second polarization direction, the processor 41 adjusts one or more of a phase center of a dual-feed array 42, a beam width of the dual-feed array 42, or the phase difference between the first feed array 421 and the second feed array 422, so that a transmit beam a2 of the first feed array and a transmit beam b2 of the second feed array form a beam c2 in the second polarization direction after being reflected by the third planar array 43, where the first polarization direction is different from the second polarization direction.

It should be understood that, because the first feed array 421 and the second feed array 422 may be considered as a whole, that is, the dual-feed array 42, the processor 41 adjusts the phase center or the beam width of the beam of either of the first feed array 421 and the second feed array 422, it may also be considered that the processor 41 adjusts the phase center or the beam width of the beam of the dual-feed array 42 (the first feed array 421 and the second feed array 422). In other words, the processor 41 may adjust any one or more of the phase centers/center of the beams/beam of the first feed array 421 and/or the second feed array 422, the beam widths/width of the beams/beam of the first feed array and/or the second feed array, or the phase difference between the beam of the first feed array and the beam of the second feed array.

A correspondence between the second polarization direction and the phase center, the beam width, or the phase difference may be obtained according to the foregoing related descriptions, and details are not described herein again.

It should be understood that polarization types of the first polarization direction and the second polarization direction may be the same or may be different. This is not limited herein. For example, the first polarization direction is linear polarization, the second polarization direction is circular polarization or elliptical polarization, and polarization types are the same. For example, the first polarization direction is horizontal polarization, the second polarization direction is vertical polarization, and polarization types are different.

The following describes a method used by an antenna system to receive a beam from the outside provided in embodiments of this application.

Figure 11:
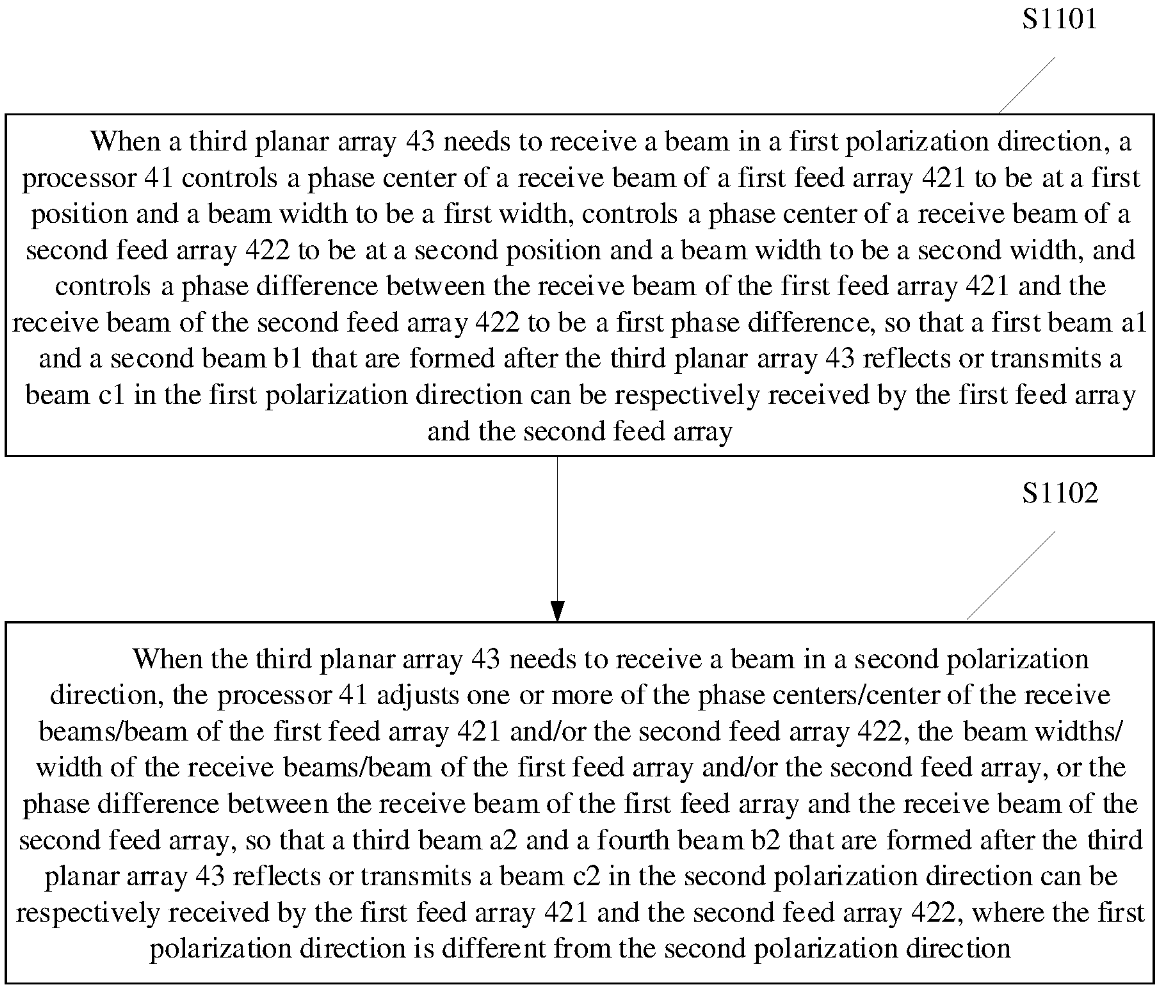
FIG. 11 is a flowchart of another method for controlling an antenna polarization direction according to an embodiment of this application.

The antenna system receives the beam from the outside, which is an inverse process of transmitting a beam to the outside, and a principle of a method for controlling a polarization direction is similar. FIG. 11 shows another method for controlling an antenna polarization direction according to an embodiment of this application. The method may be applied to the antenna system shown in FIG. 4. The method includes the following steps.

S1101: When a third planar array 43 needs to receive a beam in a first polarization direction, a processor 41 controls a phase center of a receive beam of a first feed array 421 to be at a first position and a beam width to be a first width, controls a phase center of a receive beam of a second feed array 422 to be at a second position and a beam width to be a second width, and controls a phase difference between the receive beam of the first feed array 421 and the receive beam of the second feed array 422 to be a first phase difference, so that a first beam a1 and a second beam b1 that are formed after the third planar array 43 reflects or transmits a beam c1 in the first polarization direction can be respectively received by the first feed array and the second feed array.

S1102: When the third planar array 43 needs to receive a beam in a second polarization direction, the processor 41 adjusts one or more of the phase centers/center of the receive beams/beam of the first feed array 421 and/or the second feed array 422, the beam widths/width of the receive beams/beam of the first feed array and/or the second feed array, or the phase difference between the receive beam of the first feed array and the receive beam of the second feed array, so that a third beam a2 and a fourth beam b2 that are formed after the third planar array 43 reflects or transmits a beam c2 in the second polarization direction can be respectively received by the first feed array 421 and the second feed array 422, where the first polarization direction is different from the second polarization direction.

It should be understood that during actual application, a single antenna system (or a single device) may be configured to implement only the sending method shown in FIG. 10 or the receiving method shown in FIG. 11, or may be configured to implement both the sending method shown in FIG. 10 and the receiving method shown in FIG. 11. This is not limited in this application.

Optionally, in this embodiment of this application, when adjusting the phase centers/center of the beams/beam of the first feed array 421 and/or the second feed array 422, the processor 41 may specifically control the first feed array 421 to perform beam sweeping, so that the phase center of the beam of the first feed array 421 is deflected; and/or control the second feed array 422 to perform beam sweeping, so that the phase center of the beam of the second feed array 422 is deflected.

An orthogonal dual-linear (or dual-circular) polarized multi-beam phased array antenna is used, and beam directions of different polarization are controlled through beam sweeping. As a result, the dual-feed array 42 has different phase centers, and a physical location of a feed of the reflection array antenna is fixed after the reflection array antenna is designed. Therefore, different phase centers have different aperture efficiency at a same physical location. That is, different phase centers correspond to different electric field amplitudes. As described above, an orthogonal linear polarized beam may be synthesized into a linear polarized beam with arbitrary polarization. On this basis, an adjustable capacitor or an adjustable circuit on a reflection array element is controlled to adjust a phase difference, to implement arbitrary elliptical polarization.

Figure 12:
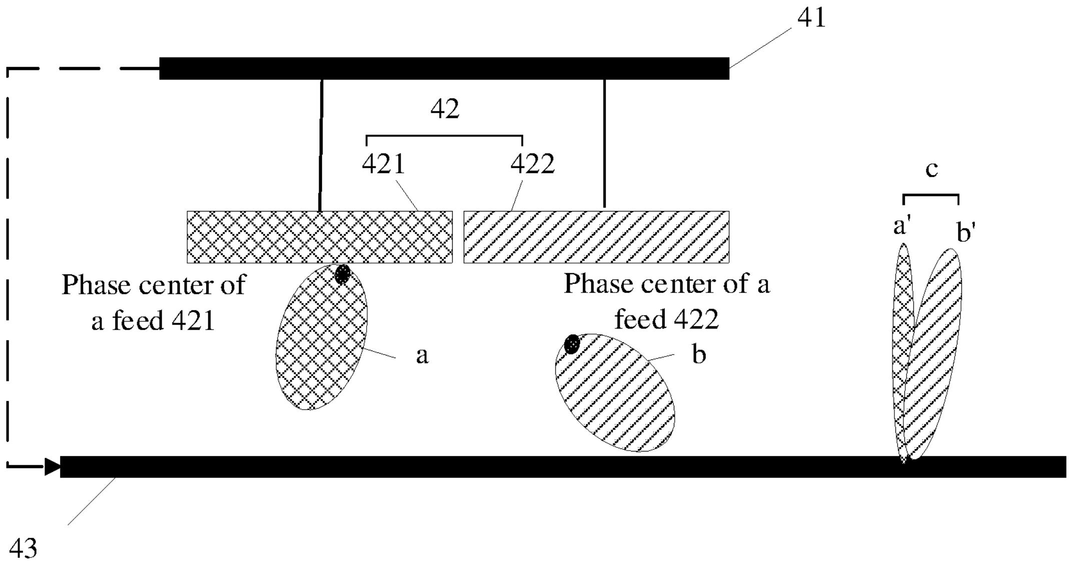
FIG. 12 is a schematic diagram in which feed arrays with different phase centers form an arbitrary polarized beam.

For example, FIG. 12 is a schematic diagram in which feed arrays with different phase centers form an arbitrary polarized beam. It should be understood that FIG. 12 shows reflected beams a' and b' corresponding to beams a and b respectively. However, in essence, the beams a' and b' may be a synthetic beam, that is, the reflected beams a' and b' point to a same location, and may be synthesized into a beam c. For a synthesis effect, refer to FIG. 4.

Figure 13:
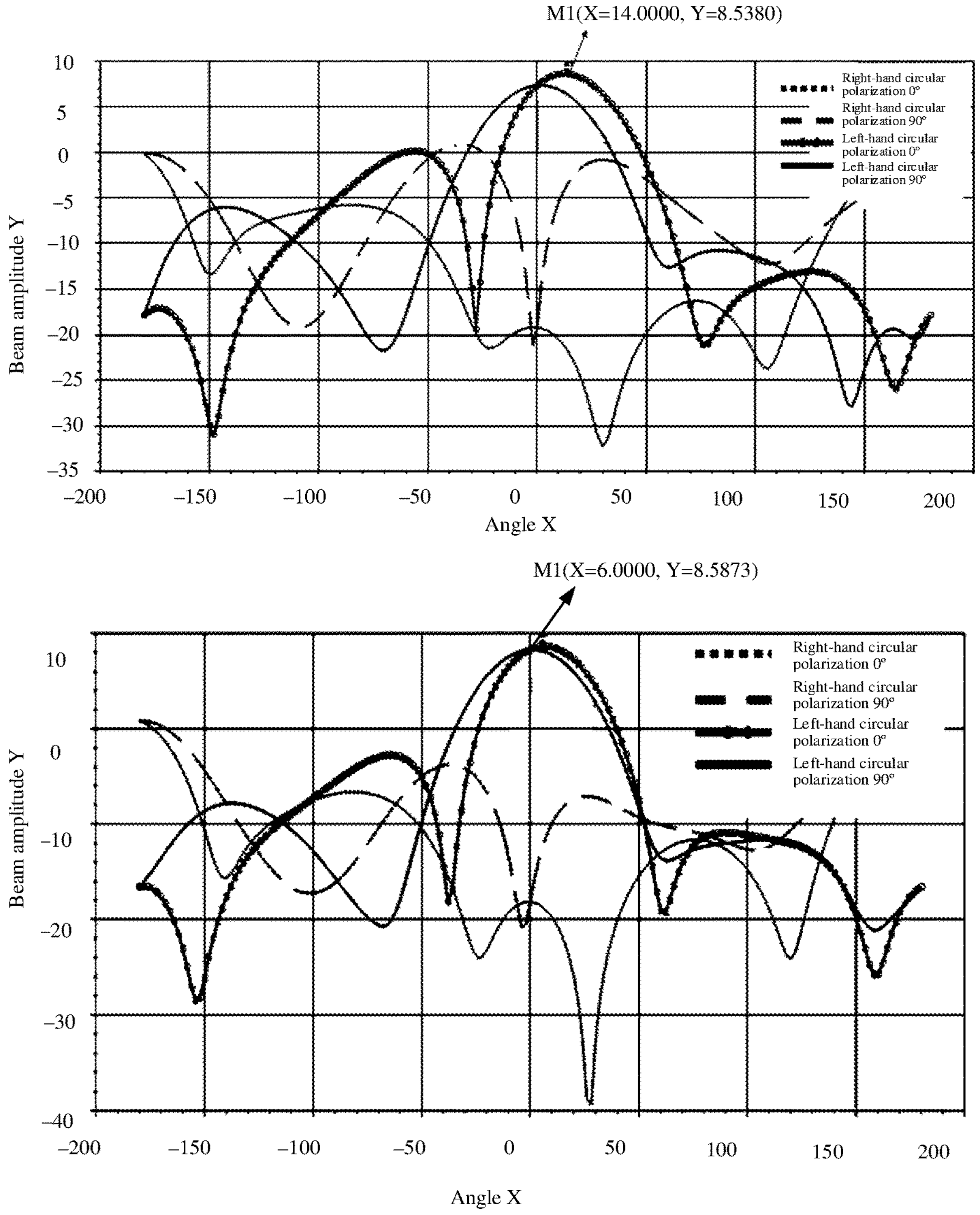
FIG. 13 is a schematic diagram of a phase center change during feed beam sweeping.

FIG. 13 is a schematic diagram of a phase center change during feed beam sweeping. During feed beam sweeping, a phase center changes. When a feed beam points to 14°, the phase center is Z:34 mm; when a feed beam points to 6°, the phase center is Z:21 mm.

Optionally, in this embodiment of this application, when adjusting the beam widths/width of the beams/beam of the first feed array 421 and/or the second feed array 422, the processor 41 may specifically control the first feed array 421 to disable or enable at least one unit; and/or control the second feed array 422 to disable or enable at least one unit.

A larger quantity of units that are turned on by the first feed array 421 and/or the second feed array 422 indicates a narrower beam, and on the contrary, a larger quantity of units that are turned off by the first feed array 421 and/or the second feed array 422 indicates a wider beam.

An orthogonal dual-linear (or dual-circular) polarized multi-beam phased array antenna is used. For example, the dual-feed array 42 uses an orthogonal dual-wire polarized multi-beam phased array antenna, and a gain of an orthogonal polarized beam is obtained through linear polarization at any angle, to calculate different aperture efficiency. Different aperture efficiency corresponds to different beam gains, that is, feeds of different beam widths. An amplitude of a port of the feed is weighted by using obtained different feed beam widths, to control a quantity of units that are turned on in the first feed array 421 and/or the second feed array 422.

Figure 14:
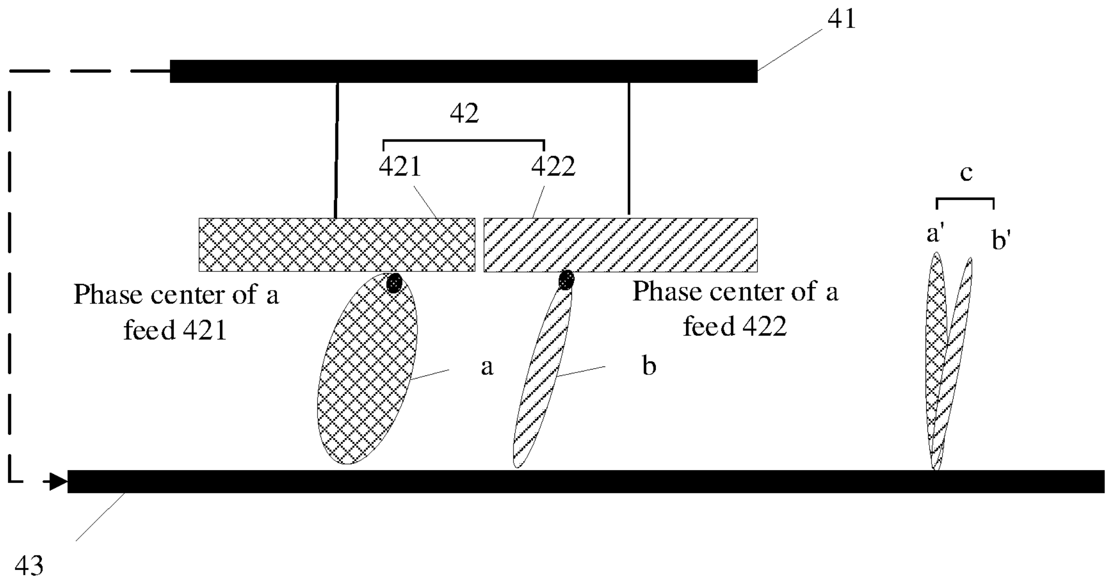
FIG. 14 is a schematic diagram of arbitrary polarization synthesis using different feed beam widths.

FIG. 14 is a schematic diagram of arbitrary polarization synthesis using different feed beam widths. A width of a beam a of a feed array 421 is greater than a width of a beam b of a feed array 422. Therefore, it may be learned that sizes of gains formed by reflection arrays are different. It should be understood that FIG. 14 shows reflected beams a' and b' corresponding to beams a and b respectively. However, in essence, the beams a' and b' may be a synthetic beam, that is, the reflected beams a' and b' point to a same location, and may be synthesized into a beam c. For a synthesis effect, refer to FIG. 4.

Optionally, when the processor 41 adjusts the phase centers/center of the beams/beam of the first feed array 421 and/or the second feed array 422, the beam widths/width of the beams/beam of the first feed array 421 and/or the second feed array 422, the phase difference between the beam of the first feed array 421 and the beam of the second feed array 422, and the like, the processor 41 may first detect amplitudes and phases of current beams of the first feed array 421 and the second feed array 422, and then determine adjustment coefficients/an adjustment coefficient of the phase centers/center, the beam widths/width, or the phases/phase of the beams/beam of the first feed array 421 and/or the second feed array 422 based on the amplitudes and the phases of the current beams of the first feed array 421 and the second feed array 422, and amplitudes and phases that need to be adjusted (that is, an adjustment requirement) of the beams of the first feed array 421 and the second feed array 422, to perform corresponding adjustment based on these adjustment coefficients, and improve adjustment accuracy.

Further optionally, after each adjustment is performed, the processor 41 detects whether amplitudes and phases of the beams of the first feed array 421 and the second feed array 422 after adjustment meet the adjustment requirement, and if the amplitudes and the phases do not meet the adjustment requirement, continues the adjustment until amplitudes and phases of the beams of the first feed array 421 and the second feed array 422 meet the adjustment requirement, to further improve adjustment accuracy.

Figure 15:
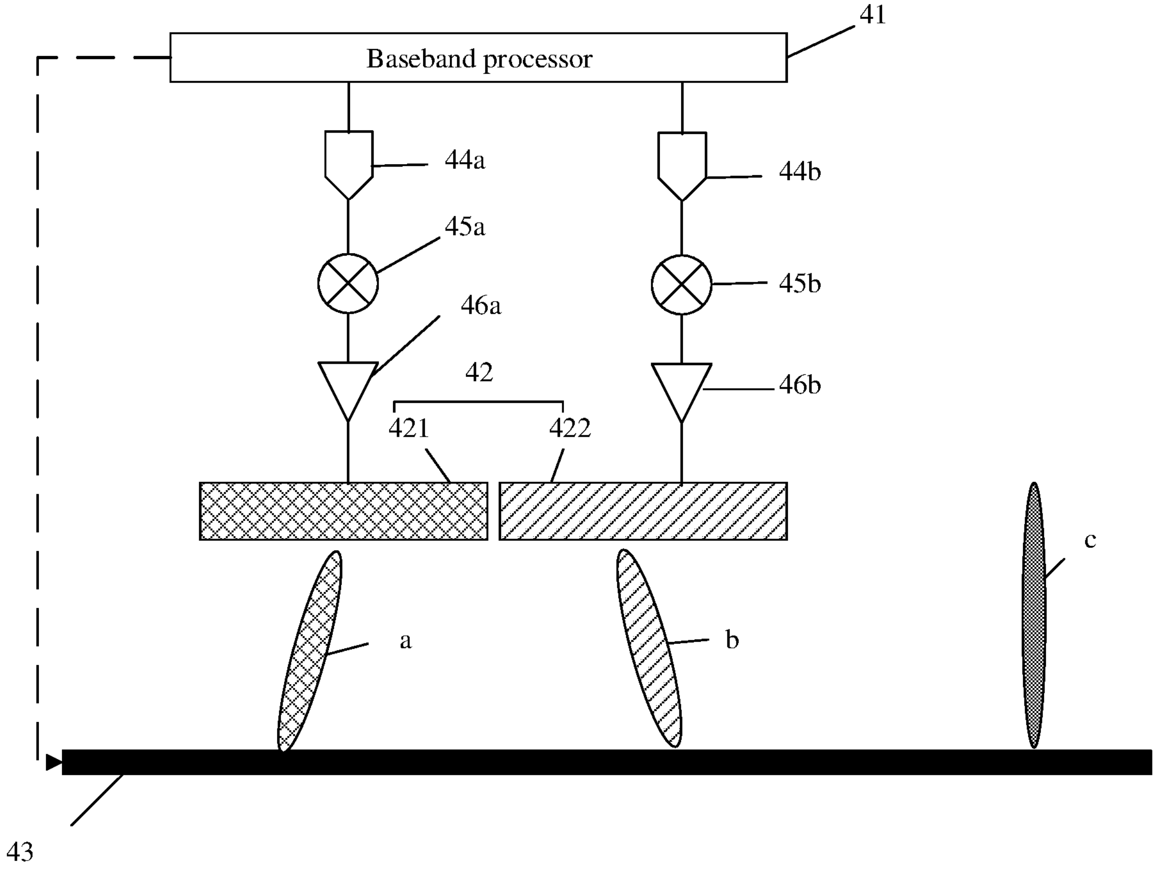
FIG. 15 is a schematic structural diagram of another antenna system according to an embodiment of this application.

It should be further noted that FIG. 4 is merely an example of a key component of the antenna system in embodiments of this application. During actual application, the antenna system may further include another component. For example, as shown in FIG. 15, the processor 41 is specifically a baseband processor. A radio frequency channel between the processor 41 and the first feed array 421 further includes a digital/analog (or analog/digital) converter 44*a*, a frequency converter 45*a*, and a power amplifier 46*a*. A radio frequency channel between the processor 41 and the second feed array 422 further includes a digital/analog (or analog/digital) converter 44*b*, a frequency converter 45*b*, and a power amplifier 46*b*.

In this embodiment of this application, the dual-linear polarized or dual-circular polarized dual-feed array 42 is set, and the beam width and/or the phase center of the dual-linearly polarized or dual-circularly polarized feed array 42 are/is adjusted in an electrical control manner, so that the antenna system can form a beam of arbitrary linear polarization or arbitrary circular polarization. Further, a phase-adjustable component is disposed on a unit structure of the third planar array 43, to form arbitrary elliptical polarization. In this way, arbitrary polarization switching can be supported, and there is no need to mechanically rotate a feed or reconfigure polarization of a reflection array unit, and implementation is simple and costs are low, and it is more convenient for actual use.

The foregoing embodiments may be combined with each other to achieve different technical effects.

Based on a same technical concept, an embodiment of this application further provides a communication apparatus, including a module configured to perform the methods/method shown in FIG. 10 and/or FIG. 11.

Figure 16:
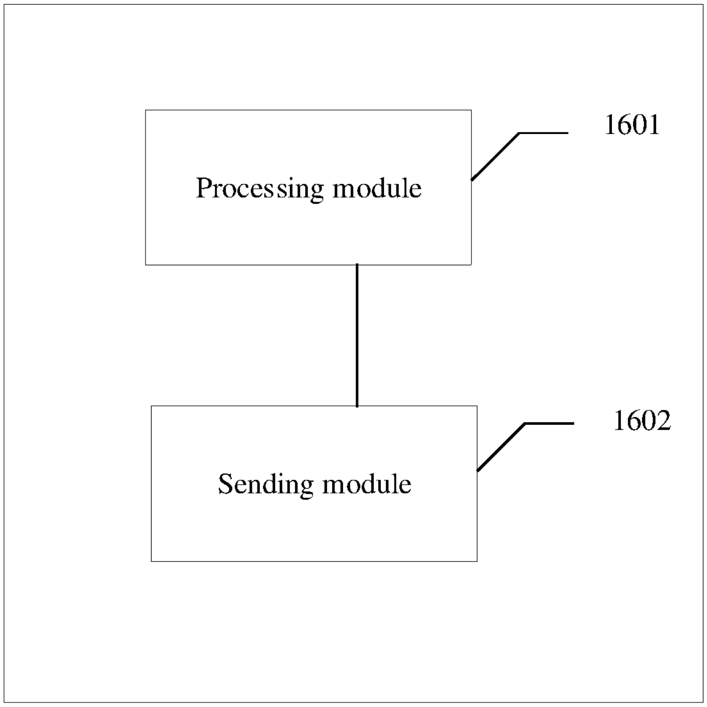
FIG. 16 is a schematic structural diagram of a communication apparatus according to an embodiment of this application.

For example, referring to FIG. 16, the apparatus may include: a processing module 1601, configured to control a phase center of a beam of a first feed array to be at a first position and a beam width to be a first width, control a phase center of a beam of a second feed array to be at a second position and a beam width to be a second width, and control a phase difference between the beam of the first feed array and the beam of the second feed array to be a first phase difference, so that the beam of the first feed array and the beam of the second feed array form a beam in a first polarization direction after being reflected or transmitted by a third planar array; and a sending module 1602, configured to send the beam in the first polarization direction to the outside.

The processing module 16*oi* is further configured to adjust one or more of the phase centers/center of the beams/beam of the first feed array and/or the second feed array, the beam widths/width of the beams/beam of the first feed array and/or the second feed array, or the phase difference between the beam of the first feed array and the beam of the second feed array, so that the beam of the first feed array and the beam of the second feed array form a beam in a second polarization direction after being reflected or transmitted by the third planar array, where the first polarization direction is different from the second polarization direction.

The sending module 1602 is further configured to send the beam in the second polarization direction to the outside.

For specific implementations of operations performed by the foregoing units, refer to specific implementations of corresponding method steps in the foregoing embodiments. Details are not described herein again.

Figure 17:
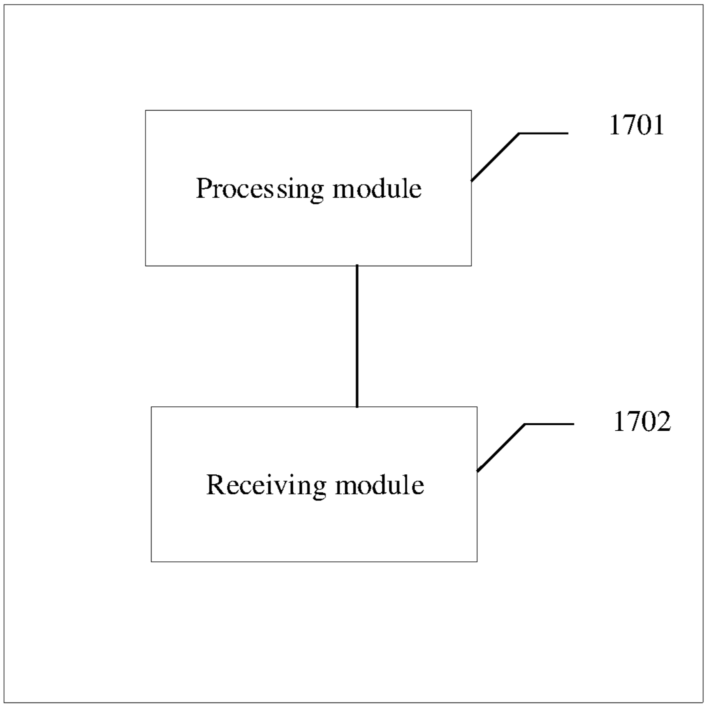
FIG. 17 is a schematic structural diagram of another communication apparatus according to an embodiment of this application.

Alternatively, for example, referring to FIG. 17, the apparatus may include: a processing module 1701, configured to: when a third planar array receives a beam in a first polarization direction, control a phase center of a beam of a first feed array to be at a first position and a beam width to be a first width, control a phase center of a beam of a second feed array to be at a second position and a beam width to be a second width, and control a phase difference between the beam of the first feed array and the beam of the second feed array to be a first phase difference, so that a first beam and a second beam that are formed after the third planar array reflects or transmits the beam in the first polarization direction can be respectively received by the first feed array and the second feed array; and a receiving module 1702, configured to receive the first beam and the second beam.

The processing module 1701 is further configured to: when the third planar array receives a beam in a second polarization direction, adjust one or more of phase centers/a phase center of the beams/beam of the first feed array and/or the second feed array, beam widths/a beam width of the beams/beam of the first feed array and/or the second feed array, or the phase difference between the beam of the first feed array and the beam of the second feed array, so that a third beam and a fourth beam that are formed after the third planar array reflects or transmits the beam in the second polarization direction can be respectively received by the first feed array and the second feed array, where the first polarization direction is different from the second polarization direction.

The receiving module 1702 is further configured to receive the third beam and the fourth beam.

For specific implementations of operations performed by the foregoing units, refer to specific implementations of corresponding method steps in the foregoing embodiments. Details are not described herein again.

Figure 18:
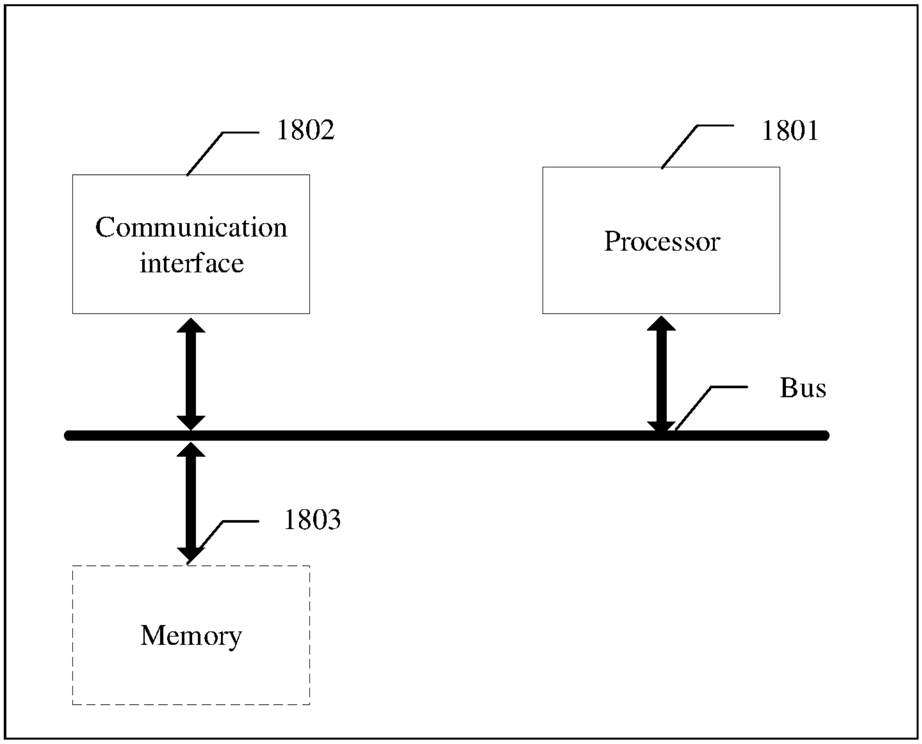
FIG. 18 is a schematic structural diagram of another communication apparatus according to an embodiment of this application.

Refer to FIG. 18. Based on a same technical concept, an embodiment of this application further provides a communication apparatus, including a processor 1801 and a communication interface 1802. The communication interface 1802 is configured to communicate with another communication apparatus. The processor 1801 is configured to run a group of programs, so that the methods/method shown in FIG. 10 and/or FIG. 11 are/is implemented.

The processor 1801 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor 1801 may be a microprocessor or any conventional processor or the like. The steps of the method disclosed with reference to embodiments of this application may be directly performed by a hardware processor, or may be performed by a combination of hardware and software modules in the processor.

The communication interface 1802 may be a transceiver, a circuit, a bus, a module, or a communication interface of another type, and is configured to communicate with another device via a transmission medium. For example, when the apparatus is a terminal, the another device may be a satellite, a gateway, or an ATG network device. When the apparatus is a satellite, a gateway, or an ATG network device, the another device may be a terminal.

Optionally, the apparatus may further include a memory 1803, configured to store program instructions and/or data. The memory 1803 may be a nonvolatile memory, for example, a hard disk drive (HDD) or a solid-state drive (SSD), or may be a volatile memory, for example, a random-access memory 1803 (RAM). The memory is any other medium that can carry or store expected program code in a form of an instruction structure or a data structure and that can be accessed by a computer, but is not limited thereto. The memory in this embodiment of this application may alternatively be a circuit or any other apparatus that can implement a storage function, and is configured to store program instructions and/or data.

The memory 1803 may be coupled to the processor 1801. The coupling in this embodiment of this application is indirect coupling or a communication connection between apparatuses, units, or modules for information exchange between the apparatuses, the units, or the modules, and may be in electrical, mechanical, or other forms. The processor 1801 may cooperate with the memory 1803. The processor 1801 may execute the program instructions stored in the memory 1803. At least one of the at least one memory 1803 may be included in the processor 1801.

It should be understood that a specific connection medium between the communication interface 1802, the processor 1801, and the memory 1803 is not limited in this embodiment of this application. In this embodiment of this application, in FIG. 18, the memory 1803, the communication interface 1802, and the processor 1801 are connected by using a bus. The bus is represented by using a thick line in FIG. 18. A connection manner between other components is merely an example for description, and is not limited thereto. The bus may be classified into an address bus, a data bus, a control bus, and the like. For ease of representation, only one thick line is used to represent the bus in FIG. 18, but this does not mean that there is only one bus or only one type of bus.

Based on a same technical concept, an embodiment of this application further provides a computer-readable storage medium. The computer storage medium stores computer-readable instructions, and when the computer-readable instructions are run on a communication apparatus, the methods/method shown in FIG. 10 and/or FIG. 11 are/is implemented.

Based on a same technical concept, an embodiment of this application further provides a chip system. The chip system includes a processor, and may further include a memory, to implement the methods/method shown in FIG. 10 and/or FIG. 11.

The chip system may include a chip, or include a chip and another discrete device.

Based on a same technical concept, an embodiment of this application further provides a computer program product, including instructions. When the computer program product runs on a computer, the computer is enabled to perform the methods/method shown in FIG. 10 and/or FIG. 11.

Embodiments of this application are described with reference to the flowcharts and/or block diagrams of the method, the device (system), and the computer program product according to embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are disposed and executed on the computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to the computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

Clearly, a person skilled in the art can make various modifications and variations to embodiments of this application without departing from the spirit and scope of this application. In this way, this application is intended to cover these modifications and variations of embodiments of this application provided that they fall within the scope of protection defined by the following claims and their equivalent technologies.

What is claimed is:

1. A method, applied to an antenna system, wherein the antenna system comprises a first feed array, a second feed array, and a third planar array, wherein a polarization direction of the first feed array is orthogonal to a polarization direction of the second feed array, and the third planar array is configured to reflect or transmit beams from the first feed array and the second feed array; and the method comprises:

controlling a phase center of a beam of the first feed array to be at a first position and a beam width of the beam of the first feed array to be a first width;

controlling a phase center of a beam of the second feed array to be at a second position and a beam width of the beam of the second feed array to be a second width;

controlling a phase difference between the beam of the first feed array and the beam of the second feed array to be a first phase difference, wherein the beam of the first feed array and the beam of the second feed array form a first beam in a first polarization direction after being reflected or transmitted by the third planar array; and adjusting one or more parameters of the beam of the first feed array or the beam of the second feed array, wherein after the adjusting the beam of the first feed array and the beam of the second feed array form a beam in a second polarization direction after being reflected or transmitted by the third planar array;

wherein the one or more parameters of the beam of the first feed array or the beam of the second feed array comprise: the phase center of the beam of the first feed array, the phase center of the beam of the second feed array, a center of the beam of the first feed array, a center of a beam of the second feed array, the beam width of the beam of the first feed array, the beam width of the beam of the second feed array, or the phase difference between the beam of the first feed array and the beam of the second feed array; and wherein the first polarization direction is different from the second polarization direction.

2. The method according to claim 1, wherein:

the polarization direction of the first feed array is a horizontal polarization direction, and the polarization direction of the second feed array is a vertical polarization direction; or the polarization direction of the first feed array is a left-hand circular polarization direction, and the polarization direction of the second feed array is a right-hand circular polarization direction.

3. The method according to claim 1, wherein the first polarization direction is any one of linear polarization, circular polarization, or elliptical polarization, and the second polarization direction is any one of linear polarization, circular polarization, or elliptical polarization.

4. The method according to claim 1, wherein adjusting the one or more parameters of the beam of the first feed array or the beam of the second feed array comprises:

controlling the first feed array to perform beam sweeping in a manner that the phase center of the beam of the first feed array is deflected; or controlling the second feed array to perform beam sweeping in a manner that the phase center of the beam of the second feed array is deflected.

5. The method according to claim 1, wherein adjusting the one or more parameters of the beam of the first feed array or the beam of the second feed array comprises:

controlling the first feed array to disable or enable at least one unit of the first feed array, to adjust the beam width of the beam of the first feed array; or controlling the second feed array to disable or enable at least one unit of the second feed array, to adjust the beam width of the beam of the second feed array.

6. The method according to claim 1, wherein:

a phase-adjustable component is disposed in a first direction of each unit of the third planar array; and adjusting the one or more parameters of the beam of the first feed array or the beam of the second feed array comprises:

adjusting an electrical parameter of the phase-adjustable component of each unit of the third planar array, to adjust the phase difference between the beam of the first feed array and the beam of the second feed array, wherein the electrical parameter of the phase-adjustable component of each unit is used to control an electrical length of the respective unit of the third planar array.

7. The method according to claim 1, further comprising:

detecting an amplitude and a phase of the beam of the first feed array and an amplitude and a phase of the beam of the second feed array; and determining an adjustment coefficient based on the amplitude and the phase of the beam of the first feed array and the amplitude and the phase of the beam of the second feed array, wherein the adjustment coefficient is of the phase center of the beam of the first feed array, the phase center of the beam of the second feed array, the center of the beam of the first feed array, the center of the beam of the second feed array, the beam width of the beam of the first feed array, the beam width of the beam of the second feed array, or the phase difference between the beam of the first feed array and the beam of the second feed array.

8. An antenna system, comprising:

at least one processor;

a first feed array;

a second feed array; and a third planar array, wherein a polarization direction of the first feed array is orthogonal to a polarization direction of the second feed array, and the third planar array is configured to reflect or transmit beams from the first feed array and the second feed array;

wherein the at least one processor is configured to:

control a phase center of a beam of the first feed array to be at a first position and a beam width of the beam of the first feed array to be a first width;

control a phase center of a beam of the second feed array to be at a second position and a beam width of the beam of the second feed array to be a second width;

control a phase difference between the beam of the first feed array and the beam of the second feed array to be a first phase difference, wherein the beam of the first feed array and the beam of the second feed array form a first beam in a first polarization direction after being reflected or transmitted by the third planar array; and adjust one or more parameters of the beam of the first feed array or the beam of the second feed array, wherein after the adjusting the beam of the first feed array and the beam of the second feed array form a beam in a second polarization direction after being reflected or transmitted by the third planar array;

wherein the one or more parameters of the beam of the first feed array or the beam of the second feed array comprise the phase center of the beam of the first feed array, the phase center of the beam of the second feed array, a center of the beam of the first feed array, a center of a beam of the second feed array, the beam width of the beam of the first feed array, the beam width of the beam of the second feed array, or the phase difference between the beam of the first feed array and the beam of the second feed array; and wherein the first polarization direction is different from the second polarization direction.

9. The antenna system according to claim 8, wherein:

the polarization direction of the first feed array is a horizontal polarization direction, and the polarization direction of the second feed array is a vertical polarization direction; or the polarization direction of the first feed array is a left-hand circular polarization direction, and the polarization direction of the second feed array is a right-hand circular polarization direction.

10. The antenna system according to claim 8, wherein the first polarization direction is any one of linear polarization, circular polarization, or elliptical polarization, and the second polarization direction is any one of linear polarization, circular polarization, or elliptical polarization.

11. The antenna system according to claim 8, wherein the at least one processor being configured to adjust one or more parameters of the beam of the first feed array or the beam of the second feed array comprises the at least one processor being configured to:

control the first feed array to perform beam sweeping in a manner that the phase center of the beam of the first feed array is deflected; or control the second feed array to perform beam sweeping in a manner that the phase center of the beam of the second feed array is deflected.

12. The antenna system according to claim 8, wherein the at least one processor being configured to adjust one or more parameters of the beam of the first feed array or the beam of the second feed array comprises the at least one processor being configured to:

control the first feed array to disable or enable at least one unit of the first feed array, to adjust the beam width of the beam of the first feed array; or control the second feed array to disable or enable at least one unit of the second feed array, to adjust the beam width of the beam of the second feed array.

13. The antenna system according to claim 8, wherein:

a phase-adjustable component is disposed in a first direction of each unit of the third planar array; and wherein the at least one processor is configured to:

adjust an electrical parameter of the phase-adjustable component of each unit, wherein the electrical parameter is used to control an electrical length of the respective unit of the third planar array.

14. The antenna system according to claim 8, wherein the at least one processor is further configured to:

detect an amplitude and a phase of the beam of the first feed array and an amplitude and a phase of the beam of the second feed array; and determine an adjustment coefficient, wherein the adjustment coefficient is of the phase center of the beam of the first feed array, the phase center of the beam of the second feed array, the center of the beam of the first feed array, the center of a beam of the second feed array, the beam width of the beam of the first feed array, the beam width of the beam of the second feed array, or the phase difference between the beam of the first feed array and the beam of the second feed array.

15. An antenna system, comprising:

at least one processor;

a first feed array;

a second feed array; and a third planar array, wherein a polarization direction of the first feed array is orthogonal to a polarization direction of the second feed array, and the third planar array is configured to reflect or transmit beams from the first feed array and the second feed array;

wherein the at least one processor is configured to:

when the third planar array receives a beam in a first polarization direction, control a phase center of a beam of the first feed array to be at a first position and a beam width of the beam of the first feed array to be a first width, control a phase center of a beam of the second feed array to be at a second position and a beam width of the beam of the second feed array to be a second width, and control a phase difference between the beam of the first feed array and the beam of the second feed array to be a first phase difference;

wherein the third planar array is configured to reflect or transmit the beam in the first polarization direction to form a first beam and a second beam, the first feed array is configured to receive the first beam, and the second feed array is configured to receive the second beam;

wherein the at least one processor is further configured to:

when the third planar array receives a beam in a second polarization direction, adjust one or more of parameters of the beam of the first feed array or the beam of the second feed array;

wherein the third planar array is further configured to reflect or transmit the beam in the second polarization direction to form a third beam and a fourth beam, the first feed array is further configured to receive the third beam, and the second feed array is further configured to receive the fourth beam;

wherein the first polarization direction is different from the second polarization direction; and wherein the one or more parameters of the beam of the first feed array or the beam of the second feed array comprise the phase center of the beam of the first feed array, the phase center of the beam of the second feed array, a center of the beam of the first feed array, a center of a beam of the second feed array, the beam width of the beam of the first feed array, the beam width of the beam of the second feed array, or the phase difference between the beam of the first feed array and the beam of the second feed array.

16. The antenna system according to claim 15, wherein:

the polarization direction of the first feed array is a horizontal polarization direction, and the polarization direction of the second feed array is a vertical polarization direction; or the polarization direction of the first feed array is a left-hand circular polarization direction, and the polarization direction of the second feed array is a right-hand circular polarization direction.

17. The antenna system according to claim 15, wherein the first polarization direction is any one of linear polarization, circular polarization, or elliptical polarization, and the second polarization direction is any one of linear polarization, circular polarization, or elliptical polarization.

18. The antenna system according to claim 15, wherein the at least one processor being configured to adjust the one or more of parameters of the beam of the first feed array or the beam of the second feed array comprises the at least one processor being configured to:

control the first feed array to perform beam sweeping in a manner that the phase center of the beam of the first feed array is deflected; or control the second feed array to perform beam sweeping in a manner that the phase center of the beam of the second feed array is deflected.

19. The antenna system according to claim 15, wherein the at least one processor being configured to adjust the one or more of parameters of the beam of the first feed array or the beam of the second feed array comprises the at least one processor being configured to:

control the first feed array to disable or enable at least one unit of the first feed array; or control the second feed array to disable or enable at least one unit of the second feed array.

20. The antenna system according to claim 15, wherein a phase-adjustable component is disposed in a first direction of each unit of the third planar array; and wherein the at least one processor is configured to:

adjust an electrical parameter of the phase-adjustable component of each unit, wherein the electrical parameter is used to control an electrical length of the respective unit of the third planar array.

* * * * *